US012682111B1

(12) United States Patent
Singh et al.

(10) Patent No.: US 12,682,111 B1
(45) Date of Patent: Jul. 14, 2026

(54) EVENT REPRESENTATION USING PUBLIC NON-FUNGIBLE TOKENS AND PRIVATE NON-FUNGIBLE TOKENS

(71) Applicant: Wells Fargo Bank, N.A., San Francisco, CA (US)

(72) Inventors: Manpreet Singh, Telangana (IN); Ramesh Babu Sarvesetty, Bangalore (IN); Himanshu Baral, Fremont, CA (US); Rameshchandra Bhaskar Ketharaju, Hyderabad (IN); John Penacerrada, Brentwood, CA (US); Shuvam Sengupta, Kolkata (IN)

(73) Assignee: Wells Fargo Bank, N.A., San Francisco, CA (US)

( * ) Notice: Subject to any disclaimer, the term of this patent is extended or adjusted under 35 U.S.C. 154(b) by 336 days.

(21) Appl. No.: 18/059,003

(22) Filed: Nov. 28, 2022

(51) Int. Cl.
*G06F 21/62* (2013.01)
*G06Q 20/38* (2012.01)
*G06Q 30/0601* (2023.01)

(52) U.S. Cl.
CPC ....... *G06F 21/6254* (2013.01); *G06Q 20/383* (2013.01); *G06Q 30/0613* (2013.01); *G06Q 2220/00* (2013.01)

(58) Field of Classification Search
CPC ............. G06Q 20/367; G06Q 30/0613; G06Q 30/0615; G06Q 2220/00; G06F 21/6254; H04L 9/50

USPC .......................................................... 705/65
See application file for complete search history.

(56) References Cited

U.S. PATENT DOCUMENTS

| | | | |
|---|---|---|---|
| 10,832,522 B2 | 11/2020 | Simons | |
| 2019/0355059 A1* | 11/2019 | Liberman | H04L 9/50 |
| 2020/0322154 A1 | 10/2020 | Konda et al. | |
| 2021/0150626 A1 | 5/2021 | Robotham | |
| 2022/0050921 A1* | 2/2022 | LaFever | G16H 10/60 |
| 2024/0086382 A1* | 3/2024 | Soon-Shiong | G06F 16/22 |
| 2024/0106800 A1* | 3/2024 | Kanza | H04L 63/0272 |

* cited by examiner

*Primary Examiner* — Wodajo Getachew
(74) *Attorney, Agent, or Firm* — K&L Gates LLP

(57) ABSTRACT

System, apparatus, and computer program products are disclosed for generating a non-fungible token (NFT) representation for an event data object. An example method includes receiving, by communications hardware, the event data object, wherein the event data object comprises one or more event metadata values and is associated with one or more participant user profiles; generating, by NFT generation circuitry, a private NFT and a public NFT based on the one or more event metadata values; and storing, by the NFT generation circuitry, the private NFT in a private blockchain system and the public NFT in a public blockchain system, wherein: (i) access to the private blockchain system is restricted to one or more participant computing devices associated with the one or more participant user profiles, and (ii) the public blockchain system is publicly accessible.

20 Claims, 9 Drawing Sheets

100

101

NFT Management System

111

NFT management computing device

112

NFT management storage device

104

Private Blockchain System

108

Communications Network

103

Public Blockchain System

Event reporting computing devices

Participant computing devices

Non-Participant computing devices

102        105        106

800

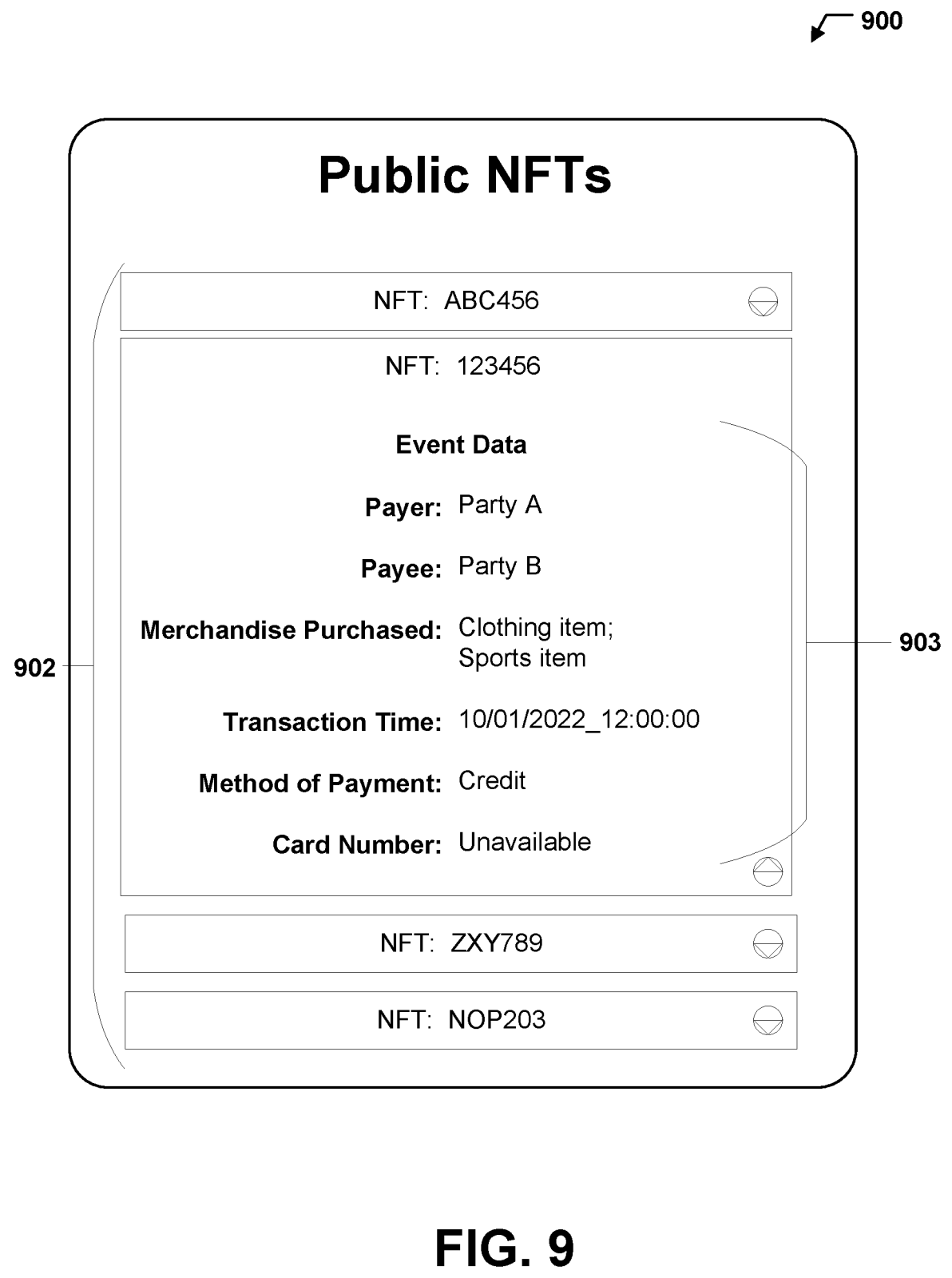

900

Public NFTs

NFT: ABC456

NFT: 123456

Event Data

Payer: Party A

Payee: Party B

Merchandise Purchased: Clothing item;
Sports item

Transaction Time: 10/01/2022_12:00:00

Method of Payment: Credit

Card Number: Unavailable

903

902

NFT: ZXY789

NFT: NOP203

FIG. 9

EVENT REPRESENTATION USING PUBLIC NON-FUNGIBLE TOKENS AND PRIVATE NON-FUNGIBLE TOKENS

TECHNOLOGICAL FIELD

Example embodiments of the present disclosure relate generally to generating a representation of an event data object and, more particularly, to systems and methods which generating a non-fungible token (NFT) representation of an event data object.

BACKGROUND

Conventional techniques for storing event data objects (e.g., transaction records) fail to ensure secure yet accessible retrieval of the noted event data objects.

BRIEF SUMMARY

Generating event representations in a secure yet transparent manner is a major technical problem that limits the scalability and effectiveness of various event processing software systems, such as various transaction processing software systems. In particular, there is a need to store an event in a manner such that sensitive attributes of the event are only accessible by those who have a relationship with the event, yet other attributes of the event are publicly accessible. For example, in the context of a transaction processing framework, there is a need to store some metadata associated with a transaction in a manner that is only accessible to parties of the transaction while storing other metadata associated with the transaction in a manner that is publicly accessible.

Additionally, it may be desirable to place event data and decisions regarding the distribution of such data in the hands of appropriate parties. For example, a user may wish to control his or her own transaction data and be presented with the choice to provide a portion of their associated event data to entities in exchange for compensation (e.g., monetary rewards, discounts, other exchanges, etc.). As such, the user who made the transaction may reap the benefits of selling such data as opposed to a third party. However, a user may wish to maintain privacy while advertising and offering their event data for sale. In order to facilitate the offer of sale of sensitive data by a user, the user may leverage systems described herein which use a public NFT stored on a public blockchain to advertise the event data for sale and a private NFT to store the details of event data, which may be transferred to a payee during a sale.

Various embodiments of the present invention enable secure yet accessible representation and storage of an event data object using two NFTs: a private NFT that is stored on a private blockchain system and a public NFT that is stored on a public blockchain system. In some embodiments, the private blockchain system is only accessible to participant user profiles associated with the event data object, while the public blockchain system is publicly accessible. In some embodiments, the described techniques are implemented using a system that includes the steps of receiving, by communications hardware, the event data object, wherein the event data object comprises one or more event metadata values and is associated with one or more participant user profiles; generating, by NFT generation circuitry, a private NFT and a public NFT based on the one or more event metadata values; and storing, by the NFT generation circuitry, the private NFT in a private blockchain system and the public NFT in a public blockchain system, wherein: (i) access to the private blockchain system is restricted to one or more participant computing devices associated with the one or more participant user profiles, and (ii) the public blockchain system is publicly accessible.

In one example embodiment, a method is provided for generating an NFT representation of an event data object. The method includes receiving, by communications hardware, the event data object, wherein the event data object comprises one or more event metadata values and is associated with one or more participant user profiles; generating, by NFT generation circuitry, a private NFT and a public NFT based on the one or more event metadata values; and storing, by the NFT generation circuitry, the private NFT in a private blockchain system and the public NFT in a public blockchain system, wherein: (i) access to the private blockchain system is restricted to one or more participant computing devices associated with the one or more participant user profiles, and (ii) the public blockchain system is publicly accessible.

In another example embodiment, an apparatus is provided for generating an NFT representation of an event data object. The apparatus includes communications hardware configured to receive, by communications hardware, the event data object, wherein the event data object comprises one or more event metadata values and is associated with one or more participant user profiles; generate, by NFT generation circuitry, a private NFT and a public NFT based on the one or more event metadata values; and store, by the NFT generation circuitry, the private NFT in a private blockchain system and the public NFT in a public blockchain system, wherein: (i) access to the private blockchain system is restricted to one or more participant computing devices associated with the one or more participant user profiles, and (ii) the public blockchain system is publicly accessible.

In another example embodiment, a computer program product is provided for generating an NFT representation of an event data object. The computer program product includes at least one non-transitory computer-readable storage medium storing software instructions that, when executed, cause an apparatus to receive, by communications hardware, the event data object, wherein the event data object comprises one or more event metadata values and is associated with one or more participant user profiles; generate, by NFT generation circuitry, a private NFT and a public NFT based on the one or more event metadata values; and store, by the NFT generation circuitry, the private NFT in a private blockchain system and the public NFT in a public blockchain system, wherein: (i) access to the private blockchain system is restricted to one or more participant computing devices associated with the one or more participant user profiles, and (ii) the public blockchain system is publicly accessible.

The foregoing brief summary is provided merely for purposes of summarizing some example embodiments described herein. Because the above-described embodiments are merely examples, they should not be construed to narrow the scope of this disclosure in any way. It will be appreciated that the scope of the present disclosure encompasses many potential embodiments in addition to those summarized above, some of which will be described in further detail below.

BRIEF DESCRIPTION OF THE FIGURES

FIG. 9 provides an operational example of a public NFT display user interface, in accordance with some example embodiments described herein.

DETAILED DESCRIPTION

Figure 1:
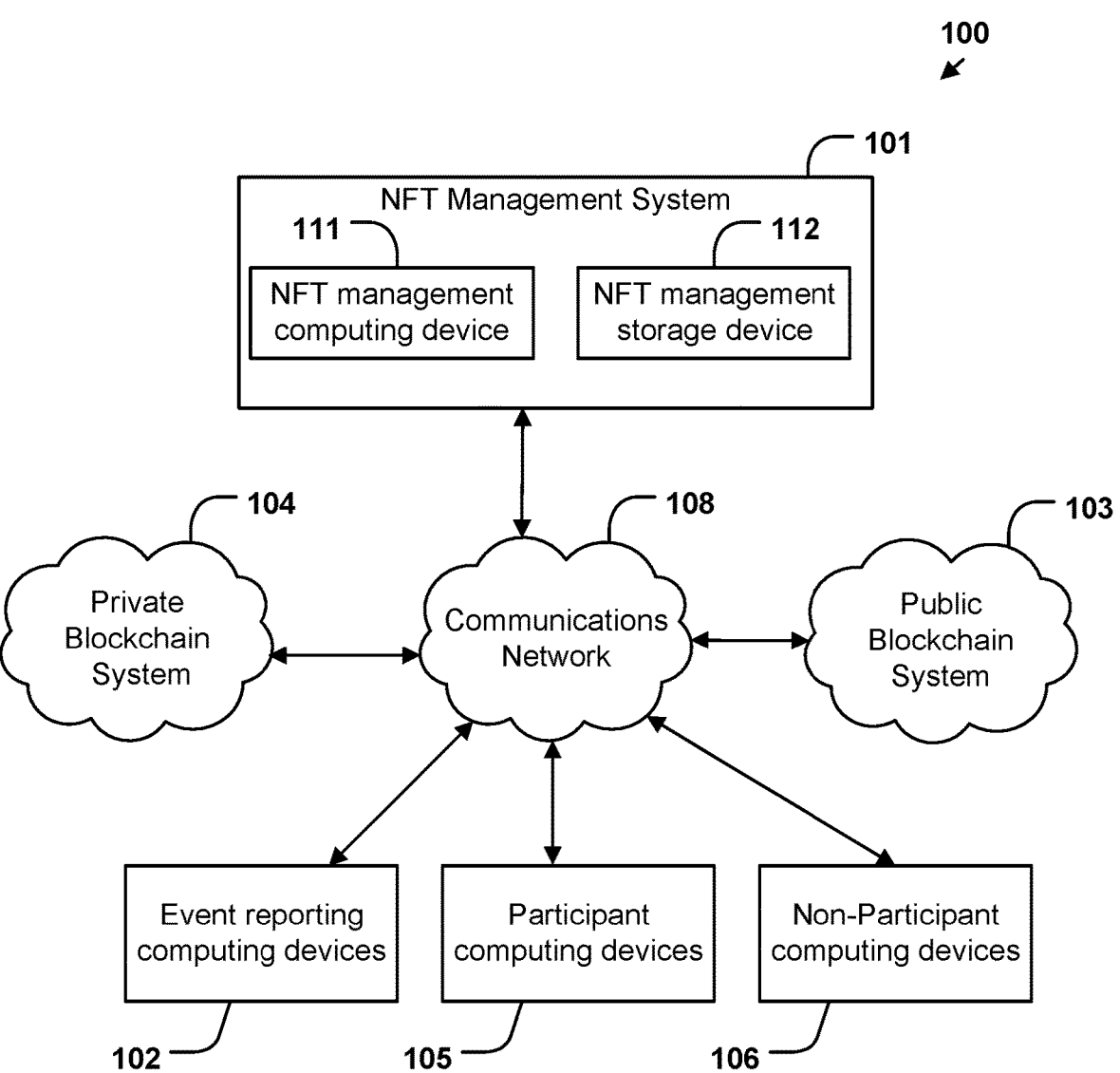
FIG. 1 illustrates a system in which some example embodiments may be used generating a verification non-fungible token, in accordance with some example embodiments described herein.

Some example embodiments will now be described more fully hereinafter with reference to the accompanying figures, in which some, but not necessarily all, embodiments are shown. Because inventions described herein may be embodied in many different forms, the invention should not be limited solely to the embodiments set forth herein; rather, these embodiments are provided so that this disclosure will satisfy applicable legal requirements.

Definition of Certain Terms

The terms "data," "content," "information," "electronic information," "signal," "command," and similar terms may be used interchangeably to refer to data capable of being transmitted, received, and/or stored in accordance with embodiments of the present disclosure. Thus, use of any such terms should not be taken to limit the spirit or scope of embodiments of the present disclosure. Further, where a first computing device is described herein to receive data from a second computing device, it will be appreciated that the data may be received directly from the second computing device or may be received indirectly via one or more intermediary computing devices, such as, for example, one or more servers, relays, routers, network access points, base stations, hosts, and/or the like, sometimes referred to herein as a "network." Similarly, where a first computing device is described herein as sending data to a second computing device, it will be appreciated that the data may be sent directly to the second computing device or may be sent indirectly via one or more intermediary computing devices, such as, for example, one or more servers, remote servers, cloud-based servers (e.g., cloud utilities), relays, routers, network access points, base stations, hosts, and/or the like.

The term "computer-readable medium" may refer to non-transitory storage hardware, non-transitory storage device or non-transitory computer system memory that may be accessed by a controller, a microcontroller, a computational system or a module of a computational system to encode thereon computer-executable instructions or software programs. A non-transitory "computer-readable medium" may be accessed by a computational system or a module of a computational system to retrieve and/or execute the computer-executable instructions or software programs encoded on the medium. Exemplary non-transitory computer-readable media may include, but are not limited to, one or more types of hardware memory, non-transitory tangible media (for example, one or more magnetic storage disks, one or more optical disks, one or more USB flash drives), computer system memory or random access memory (such as, DRAM, SRAM, EDO RAM), and the like.

The term "computing device" is used herein to refer to any one or all of programmable logic controllers (PLCs), programmable automation controllers (PACs), industrial computers, desktop computers, personal data assistants (PDAs), laptop computers, tablet computers, smart books, palm-top computers, personal computers, smartphones, wearable devices (such as headsets, smartwatches, or the like), and similar electronic devices equipped with at least a processor and any other physical components necessarily to perform the various operations described herein. Devices such as smartphones, laptop computers, tablet computers, and wearable devices are generally collectively referred to as mobile devices.

The term "server" or "server device" is used to refer to any computing device capable of functioning as a server, such as a master exchange server, web server, mail server, document server, or any other type of server. A server may be a dedicated computing device or a server module (e.g., an application) hosted by a computing device that causes the computing device to operate as a server. A server module (e.g., server application) may be a full function server module, or a light or secondary server module (e.g., light or secondary server application) that is configured to provide synchronization services among the dynamic databases on computing devices. A light server or secondary server may be a slimmed-down version of server type functionality that can be implemented on a computing device, such as a smart phone, thereby enabling it to function as an Internet server (e.g., an enterprise e-mail server) only to the extent necessary to provide the functionality described herein.

The term "distributed ledger" may refer to a database that is consensually shared and synchronized across multiple sites, institutions, or geographies. The distributed ledger may be maintained using a peer-to-peer (P2P) computer network and consensus algorithms to allow the ledger to be replicated across distributed computer nodes. In some embodiments, the distributed ledger is a blockchain. The distributed ledger may use a proof of work (PoW) consensus or proof of stake consensus (POS). The distributed ledger may be public or private. The computer network which maintains the distributed ledger may include one or more of the user devices, network-connected device, and/or system device as nodes configured to store ledger data. In some embodiments, the distributed ledger may be maintained using multiple system devices of the verification system.

The term "block" may refer to a data structure associated with a blockchain. For example, a block may comprise a model definition data structure, a block header data structure, a technical data structure, a business data structure, an operational data structure, a next block information data structure, any other suitable electronic information or data structure associated therewith (including, but not limited to, links or pointers), or any combination thereof. A block header data structure may comprise a current block hash value data structure, a previous block hash value data structure, a next block hash value data structure, a Merkle root hash value data structure, a nonce value data structure, any other suitable electronic information or data structure associated therewith (including, but not limited to, links or pointers), or any combination thereof.

The term "blockchain" may refer to a digital ledger which includes an expandable list of blocks. For example, a blockchain may include a plurality of blocks, any other suitable electronic information or data structure associated therewith (including, but not limited to, links or pointers), or any combination thereof.

The term "node device" or "node" may refer to a computing device, such as a server device, client device, a database server device, a data storage device, or a blockchain data storage device that stores one or more portions of a blockchain. For example, a node device may comprise a server device, a client device, a database, a database server device, any other suitable device or data structure associated therewith (including, but not limited to, links or pointers), or any combination thereof.

The term "smart contract" may refer to any code usable to perform changes in a blockchain or to carry some process in the blockchain. For example, a smart contract may comprise one or more blockchain-based data structures that digitally facilitate, verify, or enforce the negotiation or performance of a contract between parties.

The term "NFT management system" may refer to a server system that is configured to generate NFTs corresponding to the events reported by an event reporting computing devices and store the generated NFTs in one or more blockchain systems, such as in a public blockchain system and/or a private blockchain system. The NFT management system may further be configured to generate and store cross-token mappings between public NFTs stored by the public blockchain system and private NFTs stored by the private blockchain system. The NFT management system may further be configured to coordinate access by computing devices (e.g., the participant computing devices and/or the non-participant computing devices) to one or more blockchain systems (e.g., the public blockchain system and/or the private blockchain system). The NFT management system may include an NFT management computing device and/or an NFT management storage device.

The term "NFT management computing device" may refer to a computing device that is configured to receive event data objects describing reported events from an event reporting computing devices, generate NFTs for the event data objects, and store the generated NFTs in one or more blockchain systems, such as in a public blockchain system and/or a private blockchain system. The NFT management system may include an NFT management computing device and/or an NFT management storage device. In some embodiments, in response to receiving an event data object from an event reporting computing device, the NFT management computing device: (i) generates a private NFT for the event data object that describes one or more event metadata values that describe one or more event metadata fields of the event data object, (ii) generates a public NFT for the event data object that describes the one or more event metadata fields whose corresponding event metadata values are described by the private NFT, (iii) stores the private NFT in the private blockchain system, and (iv) stores the public NFT in the public blockchain system. In some embodiments, in response to receiving an event data object from an event reporting computing device, the NFT management computing device: (i) generates a private NFT for the event data object that describes one or more event metadata values that describe one or more event metadata fields of the event data object, (ii) generates a public NFT for the event data object that describes one or more sanitized metadata values corresponding to the one or more event metadata values described by the private NFT, (iii) stores the private NFT in the private blockchain system, and (iv) stores the public NFT in the public blockchain system.

The term "NFT management storage device" may refer to a computing device that is configured to store configuration data used by an NFT management computing device to perform one or more NFT management operations for one or more event data objects received from one or more event reporting computing devices. For example, the NFT management storage device may be configured to store cross-token mappings generated by the NFT management storage device between public tokens stored by the public blockchain system and private tokens stored by the private blockchain system. As another example, the NFT management storage device may be configured to store device identifiers (e.g., Internet Protocol (IP) addresses) for the one or more participant computing devices and/or user identifiers for one or more participant user profiles associated with the one or more participant computing devices. The NFT management storage device may be embodied as one or more direct-attached storage (DAS) devices (such as hard drives, solid-state drives, optical disc drives, or the like) or may alternatively comprise one or more Network Attached Storage (NAS) devices independently connected to a communications network. The NFT management storage device may host the software executed by the NFT management computing device to perform one or more NFT management operations for one or more event data objects received from the event reporting computing devices. The NFT management storage device may store information relied upon during operation of the NFT management computing device, such as one or more cross-token mappings, one or more participant computing device identifiers, and/or one or more participant user profile identifiers.

The term "event reporting computing device" may refer to a computing device that is configured to provide one or more event data objects each describing an event recorded/generated by the event reporting computing device to an NFT management computing device of an NFT management system. In some embodiments, the event reporting computing device is a point-of-sale (POS) system and the event data objects corresponding to one or more transaction events that are recorded/generated by the POS system.

The term "private blockchain system" may refer to a set of node devices that each stores at least a portion of a distributed ledger that is accessible only by participant computing devices, and not by non-participant computing devices. The distributed ledger may include a growing list of NFTs. Each NFT in the list may include a cryptographic hash of a previous NFT in the list and/or a timestamp for the time at which the NFT was added to the list. In some embodiments, the NFTs stored by the distributed ledger of the private blockchain system may be private NFTs, where each private NFT stores metadata values associated with an event data object.

The term "public blockchain system" may refer to a set of node devices that each stores at least a portion of a distributed ledger that is accessible by any requesting computing device. The distributed ledger may include a growing list of NFTs. Each NFT in the list may include a cryptographic hash of a previous NFT in the list and/or a timestamp for the time at which the NFT was added to the list. In some embodiments, the NFTs stored by the distributed ledger of the public blockchain system may be public NFTs, where each public NFT: (i) is mapped to a corresponding private NFT that is stored by a distributed ledger of a private blockchain system, and (ii) describes data associated with the metadata values described by the corresponding private NFT without describing the metadata values. For example, in some embodiments, a public NFT describes metadata fields associated with the metadata values described by the corresponding private NFT. As another example, in some embodiments, a public NFT describes sanitized metadata fields corresponding with the metadata values described by the corresponding private NFT.

The term "participant computing device" may refer to a user computing device that is authorized to access both the public blockchain system and the private blockchain system. In some embodiments, a participant computing device is a computing device that is used by a participant user profile that is authorized to access both a public blockchain system and a private blockchain system, where a list of user profile identifiers for a set of participant user profiles may be stored by an NFT management storage device of an NFT management system. In some embodiments, a participant computing device is a computing device whose device identifier is stored as part of a list of participant computing device identifiers stored by the NFT management storage device of the NFT management system. In some embodiments, a participant computing device is a computing device that is successfully able to obtain authentication credentials needed for successfully accessing a private blockchain interface, where the private blockchain interface is provided by the NFT management computing device of the NFT management system to enable authenticated computing devices to access the private blockchain system. The participant computing devices may be embodied by any computing devices known in the art, such as a badge-in terminal, cameras, Bluetooth terminals, smartphone, a tablet computer, a laptop computer, a wearable device, and/or the like. The participant computing devices need not themselves be independent devices but may be peripheral devices communicatively coupled to other computing devices.

The term "non-participant computing device" may refer to a user computing device that is authorized to access a public blockchain system but not a private blockchain system. In some embodiments, a non-participant computing device is a computing device that is not used by a participant user profile that is authorized to access both the public blockchain system and the private blockchain system, where a list of user profile identifiers for a set of participant user profiles may be stored by an NFT management storage device of the NFT management system. In some embodiments, a non-participant computing device is a computing device whose device identifier is not stored as part of a list of participant computing device identifiers stored by the NFT management storage device of the NFT management system. In some embodiments, a non-participant computing device is a computing device that is not successfully able to obtain authentication credentials needed for successfully accessing a private blockchain interface, where the private blockchain interface is provided by the NFT management computing device of the NFT management system to enable authenticated computing devices to access the private blockchain system. In some embodiments, a non-participant computing device is able to access a public blockchain interface, where the public blockchain interface is provided by the NFT management computing device of the NFT management system to enable authenticated computing devices to access the public blockchain system. The non-participant computing devices may be embodied by any computing devices known in the art, such as a badge-in terminal, cameras, Bluetooth terminals, smartphone, a tablet computer, a laptop computer, a wearable device, and/or the like. The non-participant computing devices need not themselves be independent devices but may be peripheral devices communicatively coupled to other computing devices.

The term "event data object" may refer to a data construct that describes one or more event metadata fields associated with an event that is recorded/generated by an event reporting computing device. The event data object may facilitate reporting of a recorded/generated event by the event reporting computing device to an NFT management system that is configured to generate and store NFTs corresponding to the reported event. In some embodiments, an event data object describes one or more metadata fields associated with a transaction that is recorded/generated by a POS system. For example, the event data object may describe at least one of a transaction time for the corresponding transaction, a transaction financial account identifier (e.g., credit card number, debit card number, bank account number, wallet identifier, and/or the like) for the corresponding transaction, participant user profiles associated with the corresponding transaction, place of the corresponding transaction, one or more items transacted via the corresponding transaction, one or more terms of the corresponding transaction, and/or the like. In some embodiments, the event data object describes a smart contract associated with a blockchain-related, a cryptocurrency-related, and/or an NFT-related transaction.

The term "private NFT" may refer to an NFT that is stored by a private blockchain system and describes event metadata values of a corresponding event data object. For example, when an event data object is associated with a transaction that is reported by a POS system, the private NFT for that corresponding transaction may describe at least one of a transaction time for the corresponding transaction, a transaction financial account identifier (e.g., credit card number, debit card number, bank account number, wallet identifier, and/or the like) for the corresponding transaction, participant user profiles associated with the corresponding transaction, place of the corresponding transaction, one or more items transacted via the corresponding transaction, one or more terms of the corresponding transaction, and/or the like. As another example, when an event data object is associated with a blockchain-related, a cryptocurrency-related, and/or an NFT-related transaction, the private NFT for that corresponding transaction may include the smart contract for the transaction.

The term "public NFT" may refer to an NFT that is stored by a public blockchain system and describes data associated with the event metadata fields of a corresponding public NFT without describing those event metadata fields directly and/or in a discernable/detectable/identifiable manner. In some embodiments, a public NFT describes event metadata fields that are associated with the event metadata values of a corresponding private NFT without describing the event metadata values. For example, if a private NFT associated with a transaction describes a transaction time of the corresponding transaction and one or more terms of the corresponding transaction, the corresponding public NFT may describe that the private NFT includes a transaction time field without specifying the transaction time value and one or more transaction term fields without specifying the particular transaction terms. In some embodiments, a public NFT describes one or more sanitized (e.g., anonymized, randomized, and/or the like) metadata values corresponding to the one or more event metadata values of the corresponding private NFT. For example, if a private NFT associated with a transaction describes a transaction time of the corresponding transaction and one or more terms of the corresponding transaction, the corresponding public NFT may describe a randomized transaction time and one or more randomized transaction terms. In some embodiments, a public NFT includes a reference to, a link to, and/or an identifier of the private NFT.

The term "sanitization technique" may refer to a data construct that describes a recommended and/or required method for converting an event metadata value to a sanitized metadata value. In some embodiments, each event metadata field is associated with a respective sanitization technique, and the respective sanitization technique for a particular event metadata field is used to convert all event metadata values that are associated with the particular event metadata field to sanitized metadata values. For example, the sanitization technique for a transaction time event metadata field may require that a given transaction time event metadata value be replaced by a sanitized metadata value that is a time value randomly selected from a time range defined by the given transaction time event metadata value. As another example, the sanitization technique for a transaction participant party metadata field may require that a given transaction participant party metadata value be replaced by a sanitized metadata value that is a predefined party designator (e.g., the predefined party designator "Party A" or "Party B"). As an additional example, the sanitization technique for a financial account identifier metadata field may require that a given financial account identifier metadata value is replaced by a sanitized metadata value that describes a financial account type of the given financial account identifier metadata value (e.g., a financial account type describing whether the given financial account identifier metadata value is a credit card number, debit card number, bank account number, wallet identifier, and/or the like).

The term "cross-token mapping" may refer to a data construct that describes an association and/or a relationship between the private NFT for an event data object and the public NFT for the same event data object. In some embodiments, an NFT management computing device may be configured to generate cross-token mappings between public NFTs stored by a public blockchain system and private NFTs stored by a private blockchain system. In some embodiments, subsequent to generating a public NFT and a private NFT for an event data object, the NFT management computing device generates a cross-token mapping that describes that the generated public NFT and the generated private NFT are mapped to each other as they are associated with a common event data object. After generating a cross-token mapping, the NFT management computing device may be configured to store the cross-token mapping in an NFT management storage device.

Overview

Various embodiments of the present invention address technical challenges associated with event representation, such as with transaction representation. As noted above, generating event representations in a secure yet transparent manner is a major technical problem that limits the scalability and effectiveness of various event processing software systems, such as various transaction processing software systems. In particular, there is a need to store an event in a manner such that sensitive attributes of the event is only accessible by those who have a relationship with the event, yet other attributes of the event is publicly accessible. For example, in the context of a transaction processing framework, there is a need to store some metadata associated with a transaction in a manner that is only accessible to parties of the transaction but metadata associated with the transaction in a manner that is publicly accessible.

Additionally, it may be desirable to place event data and decisions regarding the distribution of such data in the hands of appropriate parties. For example, a user may wish to control his or her own transaction data and be presented with the choice to provide a portion of their associated event data to entities in exchange for compensation (e.g., monetary rewards, discounts, other exchanges, etc.). As such, the user who made the transaction may reap the benefits of selling such data as opposed to a third party. However, a user may wish to maintain privacy while advertising and offering their event data for sale. In order to facilitate the offer of sale of sensitive data by a user, the user may leverage systems described herein which use a public NFT stored on a public blockchain to advertise the event data for sale and a private NFT to store the details of event data, which may be transferred to a payee during a sale.

Various embodiments of the present invention enable secure yet accessible representation and storage of an event data object using two NFTs: a private NFT that is stored on a private blockchain system and a public NFT that is stored on a public blockchain system. In some embodiments, the private blockchain system is only accessible to participant user profiles associated with the event data object, while the public blockchain system is publicly accessible. In some embodiments, the described techniques are implemented using a system that includes the steps of receiving, by communications hardware, the event data object, wherein the event data object comprises one or more event metadata values and is associated with one or more participant user profiles; generating, by NFT generation circuitry, a private NFT and a public NFT based on the one or more event metadata values; and storing, by the NFT generation circuitry, the private NFT in a private blockchain system and the public NFT in a public blockchain system, wherein: (i) access to the private blockchain system is restricted to one or more participant computing devices associated with the one or more participant user profiles, and (ii) the public blockchain system is publicly accessible.

In some embodiments, a public NFT describes event metadata fields that are associated with the event metadata values of a corresponding private NFT without describing the event metadata values. For example, if a private NFT associated with a transaction describes a transaction time of the corresponding transaction and one or more terms of the corresponding transaction, the corresponding public NFT may describe that the private NFT includes a transaction time field without specifying the transaction time value and one or more transaction term fields without specifying the particular transaction terms. In some embodiments, a public NFT describes one or more sanitized (e.g., anonymized, randomized, and/or the like) metadata values corresponding to the one or more event metadata values of the corresponding private NFT. For example, if a private NFT associated with a transaction describes a transaction time of the corresponding transaction and one or more terms of the corresponding transaction, the corresponding public NFT may describe a randomized transaction time and one or more randomized transaction terms. In some embodiments, a public NFT includes a reference to, a link to, and/or an identifier of the private NFT.

In some embodiments, by enabling representation of an event data object using a private NFT that is stored in a private blockchain system that is only accessible by a set of participant/privileged user profiles, a proposed solution enables secure representation of event data objects. In some embodiments, by enabling representation of an event data object using a public NFT that is stored in a public block-chain system that is publicly accessible, the proposed solution enables accessible representation of event data objects. Accordingly, by representation and storage of an event data object using two NFTs (i.e., a private NFT that is stored on a private blockchain system and a public NFT that is stored on a public blockchain system), various embodiments of the present invention address technical challenges associated with generating event representations in a secure yet trans-parent manner.

Although a high level explanation of the operations of example embodiments has been provided above, specific details regarding the configuration of such example embodi-ments are provided below.

System Architecture

Example embodiments described herein may be imple-mented using any of a variety of computing devices or servers. To this end, FIG. 1 illustrates an example environ-ment 100 within which various embodiments may operate. As depicted in FIG. 1, the environment includes an NFT management system 101, one or more event reporting com-puting devices 102, a public blockchain system 103, a private blockchain system 104, one or more participant computing devices 105, and one or more non-participant computing devices 106. The environment entities that oper-ate within the environment 100 of FIG. 1 (e.g., environment entities 101-106) may communicate with each other via one or more communication networks 108.

The NFT management system 101 may be configured to generate NFTs corresponding to the events reported by the event reporting computing devices 102 and store the gen-erated NFTs in one or more blockchain systems, such as in the public blockchain system 103 and/or the private block-chain system 104. The NFT management system 101 may further be configured to generate and store cross-token mappings between public NFTs stored by the public block-chain system 103 and private NFTs stored by the private blockchain system 104. The NFT management system 101 may further be configured to coordinate access by comput-ing devices (e.g., the participant computing devices 105 and/or the non-participant computing devices 106) to one or more blockchain systems (e.g., the public blockchain system 103 and/or the private blockchain system 104).

The NFT management system 101 may include an NFT management computing device 111 and an NFT manage-ment storage device 112. The NFT management computing device 111 may be configured to receive event data objects describing reported events from the event reporting com-puting devices 102, generate NFTs for the event data objects, and store the generated NFTs in one or more blockchain systems, such as in the public blockchain system 103 and/or the private blockchain system 104. In some embodiments, in response to receiving an event data object from an event reporting computing device 102, the NFT management computing device 111: (i) generates a private NFT for the event data object that describes one or more event metadata values that describe one or more event metadata fields of the event data object, (ii) generates a public NFT for the event data object that describes the one or more event metadata fields whose corresponding event metadata values are described by the private NFT, (iii) stores the private NFT in the private blockchain system 104, and (iv) stores the public NFT in the public blockchain system 103. In some embodi-ments, in response to receiving an event data object from an event reporting computing device 102, the NFT manage-ment computing device 111: (i) generates a private NFT for the event data object that describes one or more event metadata values that describe one or more event metadata fields of the event data object, (ii) generates a public NFT for the event data object that describes one or more sanitized metadata values corresponding to the one or more event metadata values described by the private NFT, (iii) stores the private NFT in the private blockchain system 104, and (iv) stores the public NFT in the public blockchain system 103.

The NFT management computing device 111 may further be configured to generate cross-token mappings between public NFTs stored by the public blockchain system 103 and private NFTs stored by the private blockchain system 104. In some embodiments, subsequent to generating a public NFT and a private NFT for an event data object, the NFT management computing device 111 generates a cross-token mapping that describes that the generated public NFT and the generated private NFT are mapped to each other as they are associated with a common event data object. After generating a cross-token mapping, the NFT management computing device 111 may be configured to store the cross-token mapping in the NFT management storage device 112.

The NFT management computing device 111 may further be configured to coordinate access by computing devices (e.g., the participant computing devices 105 and/or the non-participant computing devices 106) to one or more blockchain systems (e.g., the public blockchain system 103 and/or the private blockchain system 104). In some embodi-ments, the NFT management computing device 111 may enable the participant computing devices 105 to access both the public blockchain system 103 and the private blockchain system 104, but the non-participant computing devices 106 to only access the public blockchain system 103. Accord-ingly, the NFT management computing device 111 may prevent access to the private blockchain system 104 by the non-participant computing devices 106. In some embodi-ments, the NFT management computing device 111 enables each participant computing device 105 to access a private blockchain interface that enables the participant computing device 105 to access the private blockchain system 104. In some embodiments, the NFT management computing device 111 enables all computing devices to access a public blockchain interface that enables the computing devices to access the public blockchain system 103.

The NFT management storage device 112 may be con-figured to store configuration data used by the NFT man-agement computing device 111 to perform one or more NFT management operations for one or more event data objects received from the event reporting computing devices 102. For example, the NFT management storage device 112 may be configured to store cross-token mappings generated by the NFT management computing device 111 between public tokens stored by the public blockchain system 103 and private tokens stored by the private blockchain system 104. As another example, the NFT management storage device 112 may be configured to store device identifiers (e.g., Internet Protocol (IP) addresses) for the one or more par-ticipant computing devices 105 and/or user identifiers for one or more participant user profiles associated with the one or more participant computing devices 105.

The NFT management storage device 112 may be embodied as one or more direct-attached storage (DAS) devices (such as hard drives, solid-state drives, optical disc drives, or the like) or may alternatively comprise one or more Network Attached Storage (NAS) devices independently connected to a communications network. The NFT management storage device 112 may host the software executed by the NFT management computing device 111 to perform one or more NFT management operations for one or more event data objects received from the event reporting computing devices 102. The NFT management storage device 112 may store information relied upon during operation of the NFT management computing device 111, such as one or more cross-token mappings, one or more participant computing device identifiers, and/or one or more participant user profile identifiers.

An event reporting computing device 102 may be a computing device that is configured to provide one or more event data objects each describing an event recorded/generated by the event reporting computing device 102 to the NFT management computing device 111 of the NFT management system 101. In some embodiments, the event reporting computing device 102 is a point-of-sale (POS) system and the event data objects corresponding to one or more transaction events that are recorded/generated by the POS system.

The public blockchain system 103 may include a set of node devices that each stores at least a portion of a distributed ledger that is accessible by any requesting computing device. The distributed ledger may include a growing list of NFTs. Each NFT in the list may include a cryptographic hash of a previous NFT in the list and/or a timestamp for the time at which the NFT was added to the list. In some embodiments, the NFTs stored by the distributed ledger of the public blockchain system 103 may be public NFTs, where each public NFT: (i) is mapped to a corresponding private NFT that is stored by a distributed ledger of the private blockchain system 104, and (ii) describes data associated with the metadata values described by the corresponding private NFT without describing the metadata values. For example, in some embodiments, a public NFT describes metadata fields associated with the metadata values described by the corresponding private NFT. As another example, in some embodiments, a public NFT describes sanitized metadata fields corresponding with the metadata values described by the corresponding private NFT.

The private blockchain system 104 may include a set of node devices that each stores at least a portion of a distributed ledger that is accessible only by the participant computing devices 105, and not by non-participant computing devices 106. The distributed ledger may include a growing list of NFTs. Each NFT in the list may include a cryptographic hash of a previous NFT in the list and/or a timestamp for the time at which the NFT was added to the list. In some embodiments, the NFTs stored by the distributed ledger of the private blockchain system 104 may be private NFTs, where each private NFT stores metadata values associated with an event data object.

A participant computing device 105 may be a user computing device that is authorized to access both the public blockchain system 103 and the private blockchain system 104. In some embodiments, a participant computing device 105 is a computing device that is used by a participant user profile that is authorized to access both the public blockchain system 103 and the private blockchain system 104, where a list of user profile identifiers for a set of participant user profiles may be stored by the NFT management storage device 112 of the NFT management system 101. In some embodiments, a participant computing device 105 is a computing device whose device identifier is stored as part of a list of participant computing device identifiers stored by the NFT management storage device 112 of the NFT management system 101. In some embodiments, a participant computing device 105 is a computing device that is successfully able to obtain authentication credentials needed for successfully accessing a private blockchain interface, where the private blockchain interface is provided by the NFT management computing device 111 of the NFT management system 101 to enable authenticated computing devices to access the private blockchain system 104. The participant computing devices 105 may be embodied by any computing devices known in the art, such as a smartphone, a tablet computer, a laptop computer, a wearable device, and/or the like. The participant computing devices 105 need not themselves be independent devices but may be peripheral devices communicatively coupled to other computing devices.

A non-participant computing device 106 may be a user computing device that is authorized to access the public blockchain system 103 but not the private blockchain system 104. In some embodiments, a non-participant computing device 106 is a computing device that is not used by a participant user profile that is authorized to access both the public blockchain system 103 and the private blockchain system 104, where a list of user profile identifiers for a set of participant user profiles may be stored by the NFT management storage device 112 of the NFT management system 101. In some embodiments, a non-participant computing device 106 is a computing device whose device identifier is not stored as part of a list of participant computing device identifiers stored by the NFT management storage device 112 of the NFT management system 101. In some embodiments, a non-participant computing device 106 is a computing device that is not successfully able to obtain authentication credentials needed for successfully accessing a private blockchain interface, where the private blockchain interface is provided by the NFT management computing device 111 of the NFT management system 101 to enable authenticated computing devices to access the private blockchain system 104. In some embodiments, a non-participant computing device 106 is able to access a public blockchain interface, where the public blockchain interface is provided by the NFT management computing device 111 of the NFT management system 101 to enable authenticated computing devices to access the public blockchain system 103. The non-participant computing devices 106 may be embodied by any computing devices known in the art, such as a smartphone, a tablet computer, a laptop computer, a wearable device, and/or the like. The non-participant computing devices 106 need not themselves be independent devices but may be peripheral devices communicatively coupled to other computing devices.

Example NFT Management Computing Device

Figure 2:
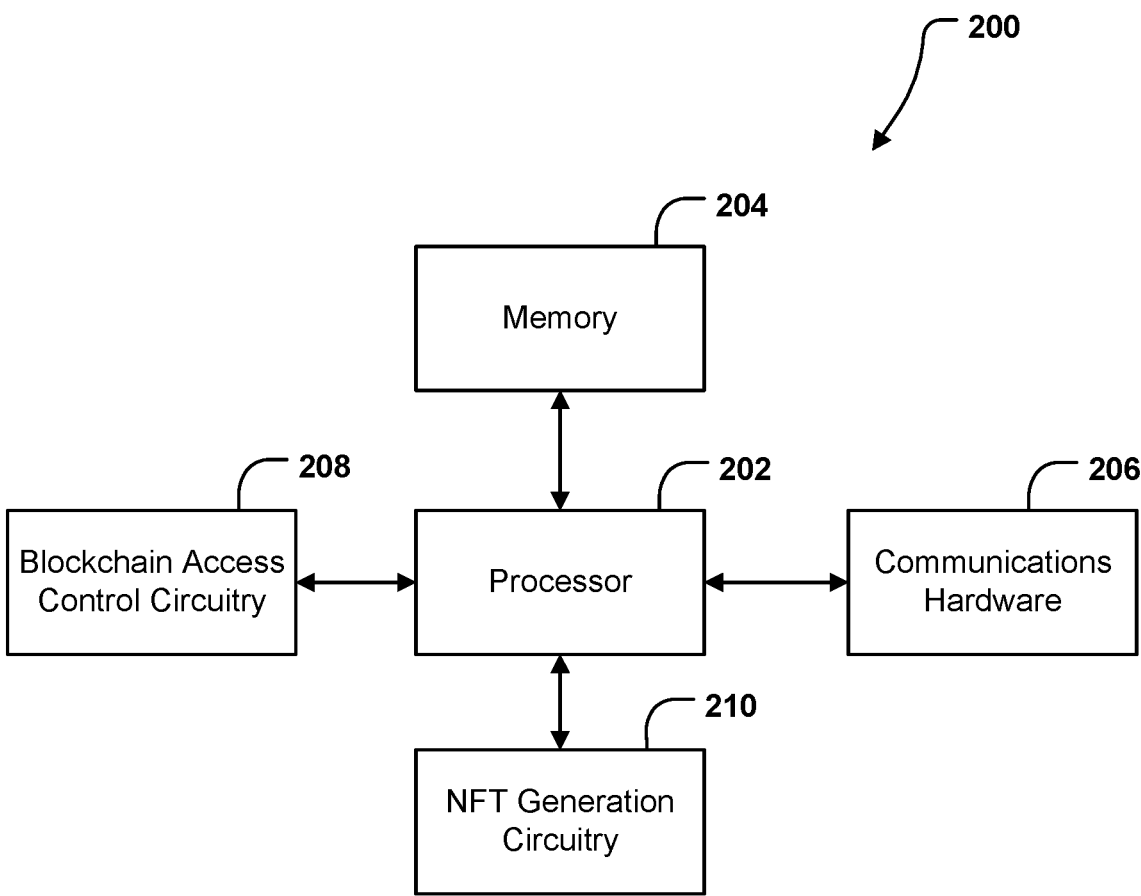
FIG. 2 illustrates a block diagram of example circuitry embodying an NFT management computing device that may perform various operations in accordance with some example embodiments described herein.

The NFT management computing device 111 of the NFT management system 101 (described previously with reference to FIG. 1) may be embodied by one or more computing devices or servers, shown as apparatus 200 in FIG. 2. As illustrated in FIG. 2, the apparatus 200 may include processor 202, memory 204, communications hardware 206, blockchain access control circuitry 208, and NFT generation circuitry 210, each of which will be described in greater detail below. While the various components are only illustrated in FIG. 2 as being connected with apparatus 200, it will be understood that the apparatus 200 may further comprise a bus (not expressly shown in FIG. 2) for passing information amongst any combination of the various components of the apparatus 200. The apparatus 200 may be configured to execute various operations described above in connection with FIG. 1 and below in connection FIGS. 4-7.

The processor 202 (and/or co-processor or any other processor assisting or otherwise associated with the processor) may be in communication with the memory 204 via a bus for passing information amongst components of the apparatus. The processor 202 may be embodied in a number of different ways and may, for example, include one or more processing devices configured to perform independently. Furthermore, the processor may include one or more processors configured in tandem via a bus to enable independent execution of software instructions, pipelining, and/or multithreading. The use of the term "processor" may be understood to include a single core processor, a multi-core processor, multiple processors of the apparatus 200, remote or "cloud" processors, or any combination thereof.

The processor 202 may be configured to execute software instructions stored in the memory 204 or otherwise accessible to the processor (e.g., software instructions stored on a separate storage device). In some cases, the processor may be configured to execute hard-coded functionality. As such, whether configured by hardware or software methods, or by a combination of hardware with software, the processor 202 represents an entity (e.g., physically embodied in circuitry) capable of performing operations according to various embodiments of the present invention while configured accordingly. Alternatively, as another example, when the processor 202 is embodied as an executor of software instructions, the software instructions may specifically configure the processor 202 to perform the algorithms and/or operations described herein when the software instructions are executed.

The memory 204 is non-transitory and may include, for example, one or more volatile and/or non-volatile memories. In other words, for example, the memory 204 may be an electronic storage device (e.g., a computer readable storage medium). The memory 204 may be configured to store information, data, content, applications, software instructions, or the like, for enabling the apparatus to carry out various functions in accordance with example embodiments contemplated herein.

The communications hardware 206 may be any means such as a device or circuitry embodied in either hardware or a combination of hardware and software that is configured to receive and/or transmit data from/to a network and/or any other device, circuitry, or module in communication with the apparatus 200. In this regard, the communications hardware 206 may include, for example, a network interface for enabling communications with a wired or wireless communication network. For example, the communications hardware 206 may include one or more network interface cards, antennas, buses, switches, routers, modems, and supporting hardware and/or software, or any other device suitable for enabling communications via a network. Furthermore, the communications hardware 206 may include the processing circuitry for causing transmission of such signals to a network or for handling receipt of signals received from a network.

The communications hardware 206 may be configured to provide output to a user and, in some embodiments, to receive an indication of user input. The communications hardware 206 comprise a user interface, such as a display, and may further comprise the components that govern use of the user interface, such as a web browser, mobile application, dedicated user device, or the like. In some embodiments, the communications hardware 206 may include a keyboard, a mouse, a touch screen, touch areas, soft keys, a microphone, a speaker, and/or other input/output mechanisms. The communications hardware 206 may utilize the processor 202 to control one or more functions of one or more of these user interface elements through software instructions (e.g., application software and/or system software, such as firmware) stored on a memory (e.g., memory 204) accessible to the processor 202.

In addition, the apparatus 200 further comprises a blockchain access control circuitry 208 that controls access to a private blockchain system based on access control data. In some embodiments, the access control data includes a list of device identifiers for a set of participant computing devices that are authorized to access the private blockchain system. In some embodiments, the access control data includes a list of user profile identifiers for a set of participant user profiles that are authorized to access the private blockchain system such that access to the private blockchain system is restricted to only participant user profiles. In some embodiments, the access control data includes a list of authentication credentials needed for authorized access to the private blockchain system.

Additionally, the apparatus 200 may also comprise a NFT generation circuitry 210 that is configured to generate a private NFT and a public NFT for each event data object. In some embodiments, the NFT generation circuitry 210: (i) generates a private NFT for an event data object that describes one or more event metadata values that describe one or more event metadata fields of the event data object, (ii) generates a public NFT for the event data object that describes the one or more event metadata fields whose corresponding event metadata values are described by the private NFT, (iii) stores the private NFT in a private blockchain system, and (iv) stores the public NFT in a public blockchain system.

Figure 3:
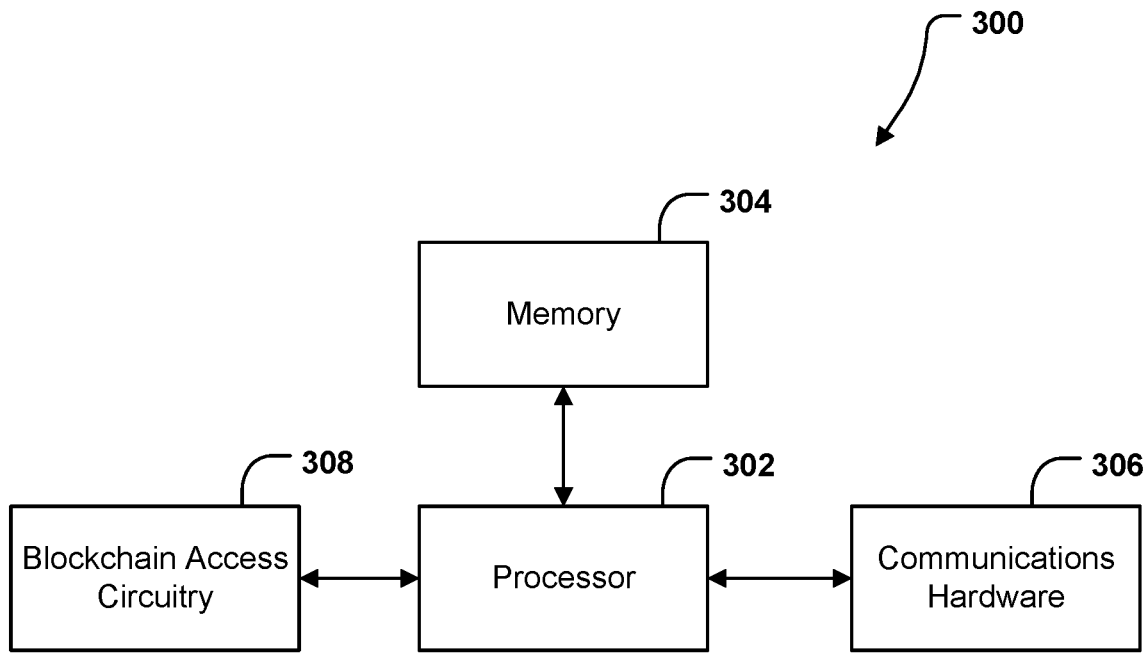
FIG. 3 illustrates a schematic block diagram of example circuitry embodying a participant computing device or a non-participant computing device that may perform various operations in accordance with some example embodiments described herein.

Example Participant Computing Device or Non-Participant Computing Device Apparatus As illustrated in FIG. 3, an apparatus 300 is shown that represents an example participant computing device 105 or an example non-participant computing device 106. As illustrated in FIG. 3, the apparatus 300 may include processor 302, memory 304, communications hardware 306, and blockchain access circuitry 308, each of which will be described in greater detail below. While the various components are only illustrated in FIG. 3 as being connected with apparatus 300, it will be understood that the apparatus 300 may further comprise a bus (not expressly shown in FIG. 3) for passing information amongst any combination of the various components of the apparatus 300. The apparatus 300 may be configured to execute various operations described above in connection with FIG. 1 and below in connection FIGS. 4-7.

The processor 302 (and/or co-processor or any other processor assisting or otherwise associated with the processor) may be in communication with the memory 304 via a bus for passing information amongst components of the apparatus. The processor 302 may be embodied in a number of different ways and may, for example, include one or more processing devices configured to perform independently. Furthermore, the processor may include one or more processors configured in tandem via a bus to enable independent execution of software instructions, pipelining, and/or multithreading. The use of the term "processor" may be understood to include a single core processor, a multi-core processor, multiple processors of the apparatus 300, remote or "cloud" processors, or any combination thereof.

The processor 302 may be configured to execute software instructions stored in the memory 304 or otherwise accessible to the processor (e.g., software instructions stored on a separate storage device). In some cases, the processor may be configured to execute hard-coded functionality. As such, whether configured by hardware or software methods, or by a combination of hardware with software, the processor 302 represents an entity (e.g., physically embodied in circuitry) capable of performing operations according to various embodiments of the present invention while configured accordingly. Alternatively, as another example, when the processor 302 is embodied as an executor of software instructions, the software instructions may specifically configure the processor 302 to perform the algorithms and/or operations described herein when the software instructions are executed.

The memory 304 is non-transitory and may include, for example, one or more volatile and/or non-volatile memories. In other words, for example, the memory 304 may be an electronic storage device (e.g., a computer readable storage medium). The memory 304 may be configured to store information, data, content, applications, software instructions, or the like, for enabling the apparatus to carry out various functions in accordance with example embodiments contemplated herein.

The communications hardware 306 may be any means such as a device or circuitry embodied in either hardware or a combination of hardware and software that is configured to receive and/or transmit data from/to a network and/or any other device, circuitry, or module in communication with the apparatus 300. In this regard, the communications hardware 306 may include, for example, a network interface for enabling communications with a wired or wireless communication network. For example, the communications hardware 306 may include one or more network interface cards, antennas, buses, switches, routers, modems, and supporting hardware and/or software, or any other device suitable for enabling communications via a network. Furthermore, the communications hardware 306 may include the processing circuitry for causing transmission of such signals to a network or for handling receipt of signals received from a network.

The communications hardware 306 may be configured to provide output to a user and, in some embodiments, to receive an indication of user input. The communications hardware 306 comprise a user interface, such as a display, and may further comprise the components that govern use of the user interface, such as a web browser, mobile application, dedicated user device, or the like. In some embodiments, the communications hardware 306 may include a keyboard, a mouse, a touch screen, touch areas, soft keys, a microphone, a speaker, and/or other input/output mechanisms. The communications hardware 306 may utilize the processor 302 to control one or more functions of one or more of these user interface elements through software instructions (e.g., application software and/or system software, such as firmware) stored on a memory (e.g., memory 304) accessible to the processor 302.

In addition, the apparatus 300 further comprises a blockchain access circuitry 308 that enables the apparatus 300 to request access to the private blockchain system. In some embodiments, the blockchain access circuitry 308 performs operations of a private blockchain access software application that is installed on the apparatus. In some embodiments, the blockchain access circuitry 308 uses the communications hardware 306 to transmit a private blockchain access request to an NFT management computing device of an NFT management system.

In some embodiments, various components of the apparatus 200 and apparatus 300 may be hosted remotely (e.g., by one or more cloud servers) and thus need not physically reside on the corresponding apparatus 200 or apparatus 300. Thus, some or all of the functionality described herein may be provided by third party circuitry. For example, a given apparatus 200 or apparatus 300 may access one or more third party circuitries via any sort of networked connection that facilitates transmission of data and electronic information between the apparatus 200 or apparatus 300 and the third party circuitries. In turn, that apparatus 200 or apparatus 300 may be in remote communication with one or more of the other components described above as comprising the apparatus 200 or apparatus 300.

As will be appreciated based on this disclosure, example embodiments contemplated herein may be implemented by an apparatus 200 or apparatus 300. Furthermore, some example embodiments may take the form of a computer program product comprising software instructions stored on at least one non-transitory computer-readable storage medium (e.g., memory 204). Any suitable non-transitory computer-readable storage medium may be utilized in such embodiments, some examples of which are non-transitory hard disks, CD-ROMs, flash memory, optical storage devices, and magnetic storage devices. It should be appreciated, with respect to certain devices embodied by apparatus 200 as described in FIG. 2 or apparatus 300 as described in FIG. 3, that loading the software instructions onto a computing device or apparatus produces a special-purpose machine comprising the means for implementing various functions described herein.

Having described specific components of example apparatus 200 and example apparatus 200, example embodiments are described below in connection with a series of diagrams and flowcharts.

Example System Operations

Figure 4:
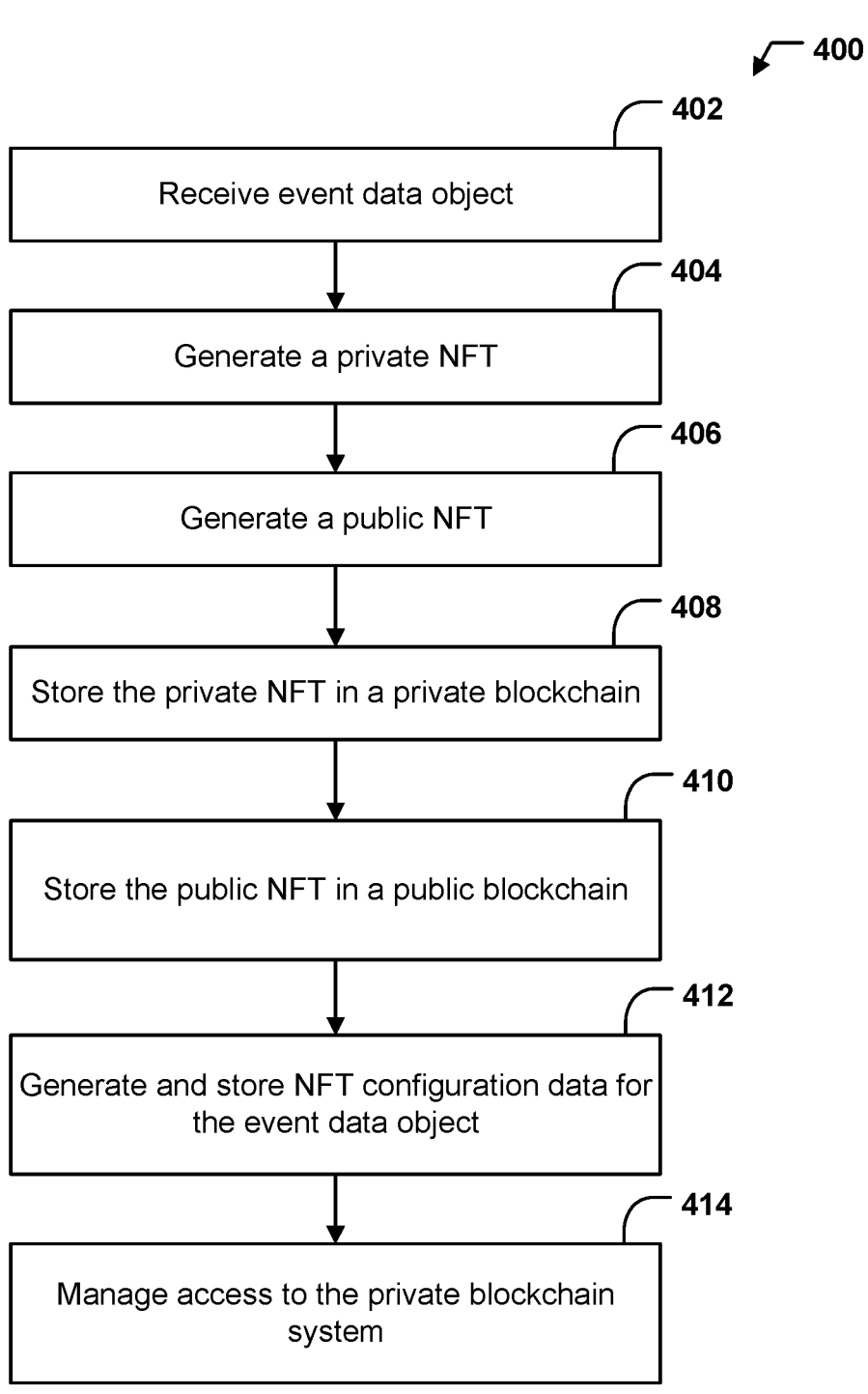
FIG. 4 illustrates an example flowchart for performing NFT management operations for NFTs generated for an event data object, in accordance with some example embodiments described herein.

Turning to FIG. 4, example flowcharts are illustrated that contain example operations implemented by example embodiments described herein. The operations illustrated in FIG. 4 may, for example, be performed by the NFT management computing device 111 of the NFT management system 101 shown in FIG. 1, which may in turn be embodied by an apparatus 200, which is in turn described in connection with FIG. 2. To perform the operations described below, the apparatus 200 may utilize one or more of processor 202, memory 204, communications hardware 206, blockchain access control circuitry 208, NFT generation circuitry 210, and/or any combination thereof. In particular, FIG. 4 depicts example operations 400 for performing NFT management operations for NFTs generated for an event data object.

As shown by operation 402, the apparatus 200 includes means such as processor 202, memory 204, communications hardware 206, blockchain access control circuitry 208, NFT generation circuitry 210, and/or the like for receiving the event data object from an event reporting computing device 102. In some embodiments, the communications hardware 206 receives the event data object from an event reporting computing device 102.

An event data object may describe one or more event metadata fields associated with an event that is recorded and/or generated by an event reporting computing device 102. The event data object may facilitate reporting of a recorded and/or generated event by the event reporting computing device to an NFT management system 101 that is configured to generate and store NFTs corresponding to the reported event. In some embodiments, an event data object describes one or more metadata fields associated with a transaction that is recorded/generated by a POS system. For example, the event data object may describe at least one of a transaction time for the corresponding transaction, a transaction financial account identifier (e.g., credit card number, debit card number, bank account number, wallet identifier, and/or the like) for the corresponding transaction, participant user profiles associated with the corresponding transaction, place of the corresponding transaction, one or more items transacted via the corresponding transaction, one or more terms of the corresponding transaction, and/or the like. In some embodiments, the event data object describes a smart contract associated with a blockchain-related, a cryptocurrency-related, and/or an NFT-related transaction.

At operation 404, the apparatus 200 includes means such as processor 202, memory 204, communications hardware 206, blockchain access control circuitry 208, NFT generation circuitry 210, and/or the like for generating a private NFT for the event data object. In some embodiments, the NFT generation circuitry 210 receives the event data object from the communications hardware 206 and subsequently generates the private NFT based on the metadata fields that are described by the event data object.

In some embodiments, a private NFT is an NFT that is stored by a private blockchain system and describes event metadata values of a corresponding event data object. For example, when an event data object is associated with a transaction that is reported by a POS system, the private NFT for that corresponding transaction may describe at least one of a transaction time for the corresponding transaction, a transaction financial account identifier (e.g., credit card number, debit card number, bank account number, wallet identifier, and/or the like), details of the transaction (e.g., the particular merchandise purchased, a category of merchandise purchased), for the corresponding transaction, participant user profiles associated with the corresponding transaction, place of the corresponding transaction, one or more items transacted via the corresponding transaction, one or more terms of the corresponding transaction, and/or the like. As another example, when an event data object is associated with a blockchain-related, a cryptocurrency-related, and/or an NFT-related transaction, the private NFT for that corresponding transaction may include the smart contract for the transaction.

At operation 406, the apparatus 200 includes means such as processor 202, memory 204, communications hardware 206, blockchain access control circuitry 208, NFT generation circuitry 210, and/or the like for generating a public NFT for the event data object. In some embodiments, the NFT generation circuitry 210 receives the event data object from the communications hardware 206 and subsequently generates the public NFT based on the metadata fields that are described by the event data object. In some embodiments, the NFT generation circuitry 210 receives the event data object from the communications hardware 206, then generates the private NFT based on the metadata fields that are described by the event data object, and subsequently generates the public NFT based on the private NFT.

In some embodiments, a public NFT is an NFT that is stored by a public blockchain system and describes data associated with the event metadata fields of a corresponding public NFT without describing those event metadata fields directly and/or in a discernable, detectable, or otherwise identifiable manner. In some embodiments, a public NFT describes event metadata fields that are associated with the event metadata values of a corresponding private NFT without describing the event metadata values. For example, if a private NFT associated with a transaction describes a transaction time of the corresponding transaction and one or more terms of the corresponding transaction, the corresponding public NFT may describe that the private NFT includes a transaction time field without specifying the transaction time value and one or more transaction term fields without specifying the particular transaction terms. In some embodiments, a public NFT describes one or more sanitized (e.g., anonymized, randomized, and/or the like) metadata values corresponding to the one or more event metadata values of the corresponding private NFT. For example, if a private NFT associated with a transaction describes a transaction time of the corresponding transaction and one or more terms of the corresponding transaction, the corresponding public NFT may describe a randomized transaction time and one or more randomized transaction terms. In some embodiments, a public NFT includes a reference to, a link to, and/or an identifier of the private NFT.

Figure 5:
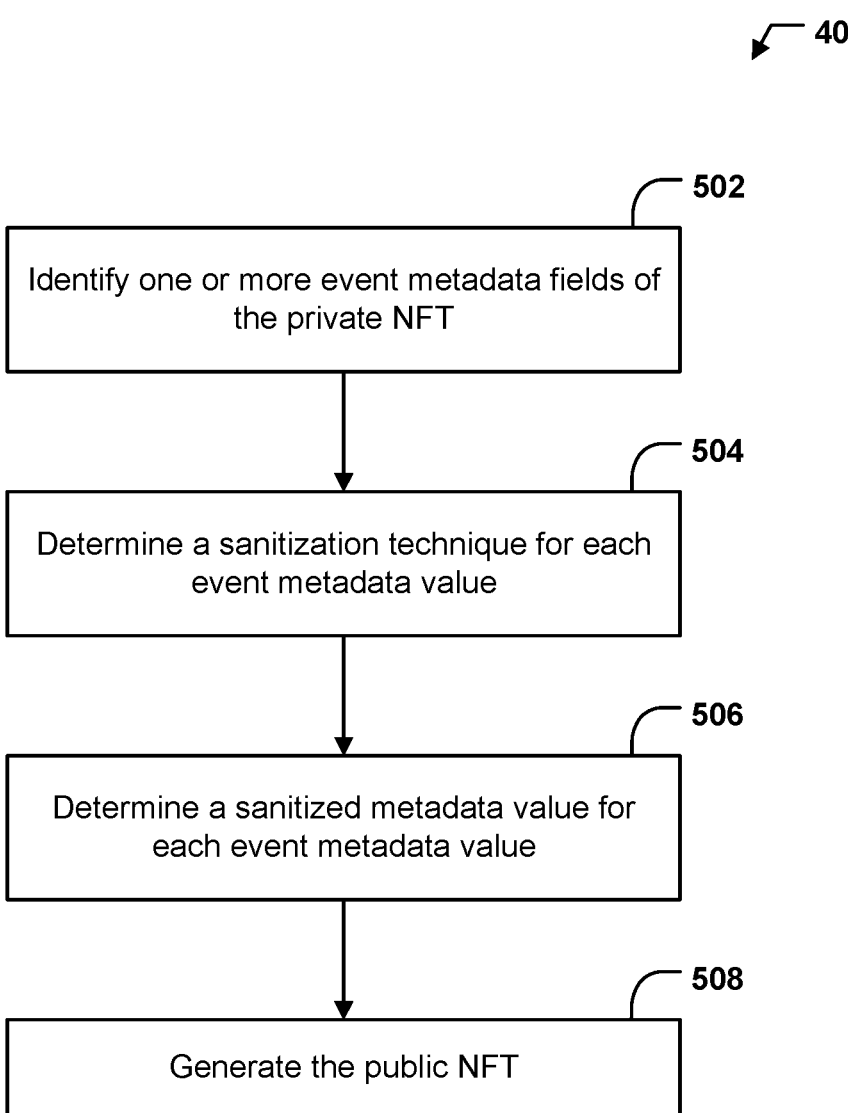
FIG. 5 illustrates an example flowchart for generating a public NFT for an event data object, in accordance with some example embodiments described herein.

Turning now to FIG. 5, example operations are depicted for generating a public NFT for an event data object. At operation 502, the apparatus 200 includes means such as processor 202, memory 204, communications hardware 206, blockchain access control circuitry 208, NFT generation circuitry 210, and/or the like for identifying one or more event metadata fields of the private NFT for the event data object. In some embodiments, the NFT generation circuitry 210 generates the private NFT for the event data object and subsequently retrieves the event metadata values described by the generated private NFT.

At operation 504, the apparatus 200 includes means such as processor 202, memory 204, communications hardware 206, blockchain access control circuitry 208, NFT generation circuitry 210, and/or the like for determining a sanitization technique for each event metadata value. In some embodiments, the NFT generation circuitry 210 determines, for each event metadata value, a sanitization technique for the noted event metadata value.

A sanitization technique may describe a recommended and/or required method for converting an event metadata value to a sanitized metadata value. In some embodiments, each event metadata field is associated with a respective sanitization technique, and the respective sanitization technique for a particular event metadata field is used to convert all event metadata values that are associated with the particular event metadata field to sanitized metadata values. For example, the sanitization technique for a transaction time event metadata field may require that a given transaction time event metadata value be replaced by a sanitized metadata value that is a time value randomly selected from a time range defined by the given transaction time event metadata value. As another example, the sanitization technique for a transaction participant party metadata field may require that a given transaction participant party metadata value be replaced by a sanitized metadata value that is a predefined party designator (e.g., the predefined party designator "Party A" or "Party B"). As an additional example, the sanitization technique for a financial account identifier metadata field may require that a given financial account identifier metadata value is replaced by a sanitized metadata value that describes a financial account type of the given financial account identifier metadata value or is replaced with synthetic data values. As another example, the sanitization technique for a financial account identifier metadata field may require that a given financial account identifier metadata value is replaced by an indicator that this data is unavailable. As yet another example, the sanitization technique for a transaction detail metadata field may require that a particular item (e.g., a size "small" pink brand 123 shirt from XYZ store) from involved in the transaction be replaced by a sanitized metadata value that describes a broader category of the item (e.g., a "clothing" item category).

At operation 506, the apparatus 200 includes means such as processor 202, memory 204, communications hardware 206, blockchain access control circuitry 208, NFT generation circuitry 210, and/or the like for determining a sanitized metadata value for each event metadata value based on the determined sanitization technique for the sanitized metadata value. In some embodiments, the NFT generation circuitry 210 determines a sanitized metadata value for each event metadata value based on the determined sanitization technique for the sanitized metadata value.

As described above, the sanitization technique for an event metadata value may describe a recommended and/or required method for converting the event metadata value to a sanitized metadata value. Accordingly, the sanitization technique for an event metadata value may be used to apply one or more sanitization operations to the event metadata value in order to generate the sanitized metadata value for the event metadata value. For example, if the sanitization technique for a given event metadata value requires that the given metadata value be sanitized by randomly selecting a value from a defined range, then the noted randomization operations may be used to generate the sanitized metadata value for the given event metadata value. As another example, if the sanitization technique for a given event metadata value requires that the given metadata value be sanitized using a predefined event metadata value, then the randomization operations used to generate the sanitized metadata value for the given event metadata value may be configured to replace the given event metadata value with the predefined event metadata value (e.g., the predefined event metadata value "Party A" or "Party B").

At operation 508, the apparatus 200 includes means such as processor 202, memory 204, communications hardware 206, blockchain access control circuitry 208, NFT generation circuitry 210, and/or the like for generating the public NFT by combining the sanitized metadata values for all of the event metadata values of the private NFT. In some embodiments, the NFT generation circuitry 210 is configured to generate the public NFT by combining the sanitized metadata values for all of the event metadata values of the private NFT.

Returning to FIG. 4, at operation 408, the apparatus 200 includes means such as processor 202, memory 204, communications hardware 206, blockchain access control circuitry 208, NFT generation circuitry 210, and/or the like for storing the private NFT in the private blockchain system. In some embodiments, the NFT generation circuitry 210 provides the private NFT to the communications hardware 206, and the communications hardware 206 then stores the private NFT in the private blockchain system by storing the private NFT in the distributed ledger of the private blockchain system in accordance with a distributed storage scheme of the distributed ledger.

The private blockchain system may include a set of node devices that each stores at least a portion of a distributed ledger that is accessible only by participant computing devices, and not by non-participant computing devices. As such, access to the private blockchain system is restricted to allow access only the one or more participant computing devices which are associated with the one or more participant user profiles while denying access to other computing devices (e.g., non-participant computing devices). The distributed ledger may include a growing list of NFTs. Each NFT in the list may include a cryptographic hash of a previous NFT in the list and/or a timestamp for the time at which the NFT was added to the list. In some embodiments, the NFTs stored by the distributed ledger of the private blockchain system may be private NFTs, where each private NFT stores metadata values associated with an event data object.

Returning to FIG. 4, at operation 410, the apparatus 200 includes means such as processor 202, memory 204, communications hardware 206, blockchain access control circuitry 208, NFT generation circuitry 210, and/or the like for storing the public NFT in the public blockchain system. In some embodiments, the NFT generation circuitry 210 provides the public NFT to the communications hardware 206, and the communications hardware 206 then stores the public NFT in the public blockchain system by storing the public NFT in the distributed ledger of the public blockchain system in accordance with a distributed storage scheme of the distributed ledger.

The public blockchain system may include a set of node devices that each stores at least a portion of a distributed ledger that is accessible by any requesting computing device. The distributed ledger may include a growing list of NFTs. Each NFT in the list may include a cryptographic hash of a previous NFT in the list and/or a timestamp for the time at which the NFT was added to the list. In some embodiments, the NFTs stored by the distributed ledger of the public blockchain system may be public NFTs, where each public NFT: (i) is mapped to a corresponding private NFT that is stored by a distributed ledger of a private blockchain system, and (ii) describes data associated with the metadata values described by the corresponding private NFT without describing the metadata values. For example, in some embodiments, a public NFT describes metadata fields associated with the metadata values described by the corresponding private NFT. As another example, in some embodiments, a public NFT describes sanitized metadata fields corresponding with the metadata values described by the corresponding private NFT.

At operation 412, the apparatus 200 includes means such as processor 202, memory 204, communications hardware 206, blockchain access control circuitry 208, NFT generation circuitry 210, and/or the like for generating and storing NFT configuration data for the event data object. In some embodiments, the NFT generation circuitry 210 generates the NFT configuration data for the event data object and stores the NFT configuration data in the NFT management storage device 112 of the NFT management system 101 of FIG. 1.

NFT configuration data for a corresponding event data object may include at least one of: (i) an NFT identifier for the private NFT that is generated for the corresponding event data object, (ii) an NFT identifier for the public NFT that is generated for the corresponding event data object, (iii) a cross-token mapping for the corresponding event data object that describes an association/relationship between the private NFT that is generated for the corresponding event data object and the public NFT that is generated for the corresponding event data object, and (iv) a data field that describes that the computing device associated with the event data object is a participant computing device that is authorized to access the private blockchain system or that the user profile associated with the event data object is a participant user profile that is authorized to access the private blockchain system.

Figure 6:
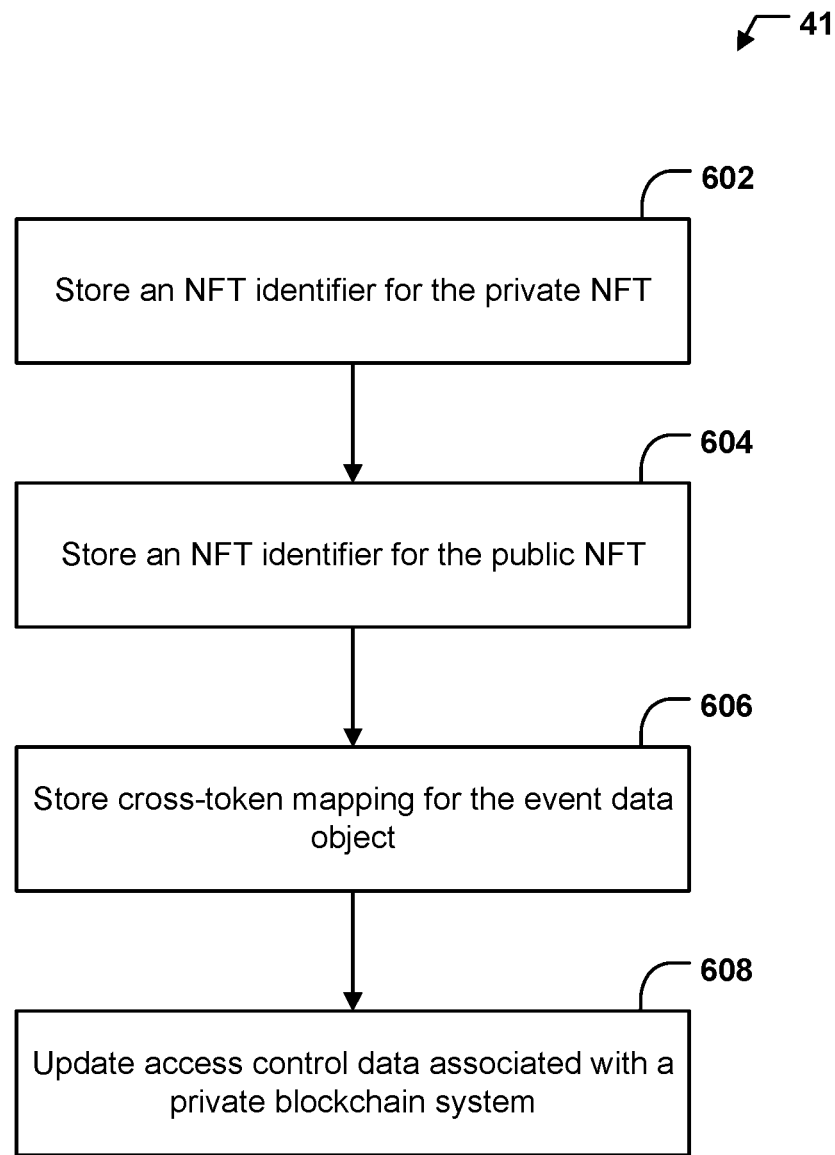
FIG. 6 illustrates an example flowchart for generating and storing NFT configuration data for an event data object, in accordance with some example embodiments described herein.

Turning now to FIG. 6, example operations are depicted for generating and storing NFT configuration data for an event data object. At operation 602, the apparatus 200 includes means such as processor 202, memory 204, communications hardware 206, blockchain access control circuitry 208, NFT generation circuitry 210, and/or the like for storing an NFT identifier (e.g., an NFT link) for the private NFT that is generated for the event data object. In some embodiments, the NFT generation circuitry 210 stores the NFT identifier for the private NFT that is generated for the event data object in the NFT management storage device 112 of the NFT management system 101 of FIG. 1.

At operation 604, the apparatus 200 includes means such as processor 202, memory 204, communications hardware 206, blockchain access control circuitry 208, NFT generation circuitry 210, and/or the like for storing an NFT identifier (e.g., an NFT link) for the public NFT that is generated for the event data object. In some embodiments, the NFT generation circuitry 210 stores the NFT identifier for the public NFT that is generated for the event data object in the NFT management storage device 112 of the NFT management system 101 of FIG. 1.

At operation 606, the apparatus 200 includes means such as processor 202, memory 204, communications hardware 206, blockchain access control circuitry 208, NFT generation circuitry 210, and/or the like for storing a cross-token mapping for the event data object. In some embodiments, the NFT generation circuitry 210 stores the cross-token mapping for the event data object in the NFT management storage device 112 of the NFT management system 101 of FIG. 1.

A cross-token mapping may describe an association and/ or a relationship between the private NFT for an event data object and the public NFT for the same event data object. In some embodiments, an NFT management computing device may be configured to generate cross-token mappings between public NFTs stored by a public blockchain system and private NFTs stored by a private blockchain system. In some embodiments, subsequent to generating a public NFT and a private NFT for an event data object, the NFT management computing device generates a cross-token mapping that describes that the generated public NFT and the generated private NFT are mapped to each other as they are associated with a common event data object. After generating a cross-token mapping, the NFT management computing device may be configured to store the cross-token mapping in an NFT management storage device.

At operation 608, the apparatus 200 includes means such as processor 202, memory 204, communications hardware 206, blockchain access control circuitry 208, NFT generation circuitry 210, and/or the like for updating access control data associated with a private blockchain system. In some embodiments, the access control data is stored by the NFT management storage device 112 of the NFT management system 101 of FIG. 1. In some embodiments, the NFT generation circuitry 210 updates the access control data stored in the NFT management storage device 112.

In some embodiments, the access control data includes a list of device identifiers for a set of participant computing devices that are authorized to access the private blockchain system. In some embodiments, the access control data includes a list of user profile identifiers for a set of participant user profiles that are authorized to access the private blockchain system. In some embodiments, the access control data includes a list of authentication credentials needed for authorized access to the private blockchain system.

In some embodiments, when the private NFT for an event data object is stored in the private blockchain system, user profiles associated with the parties to the corresponding event are added to the list of participant user profiles maintained by the NFT management storage device. For example, when the private NFT for an event data object that is associated with a transaction is stored in the private blockchain system, user profiles associated with the parties to the corresponding transaction are added to the list of participant user profiles maintained by the NFT management storage device.

In some embodiments, when the private NFT for an event data object is stored in the private blockchain system, computing devices associated with the parties to the corresponding event are added to the list of participant computing devices maintained by the NFT management storage device. For example, when the private NFT for an event data object that is associated with a transaction is stored in the private blockchain system, computing devices associated with the parties to the corresponding transaction are added to the list of participant computing devices maintained by the NFT management storage device.

Returning to FIG. 4, at operation 414, the apparatus 200 includes means such as processor 202, memory 204, communications hardware 206, blockchain access control circuitry 208, NFT generation circuitry 210, and/or the like for managing access to the private blockchain system. In some embodiments, the blockchain access control circuitry 208 enables access to the private blockchain system to participant computing devices by enabling a blockchain access software application that operates on the participant computing devices to successfully access a private blockchain interface. The private blockchain interface may thus be configured to enable participant computing devices to access the private blockchain system that stores the private NFTs.

Figure 7:
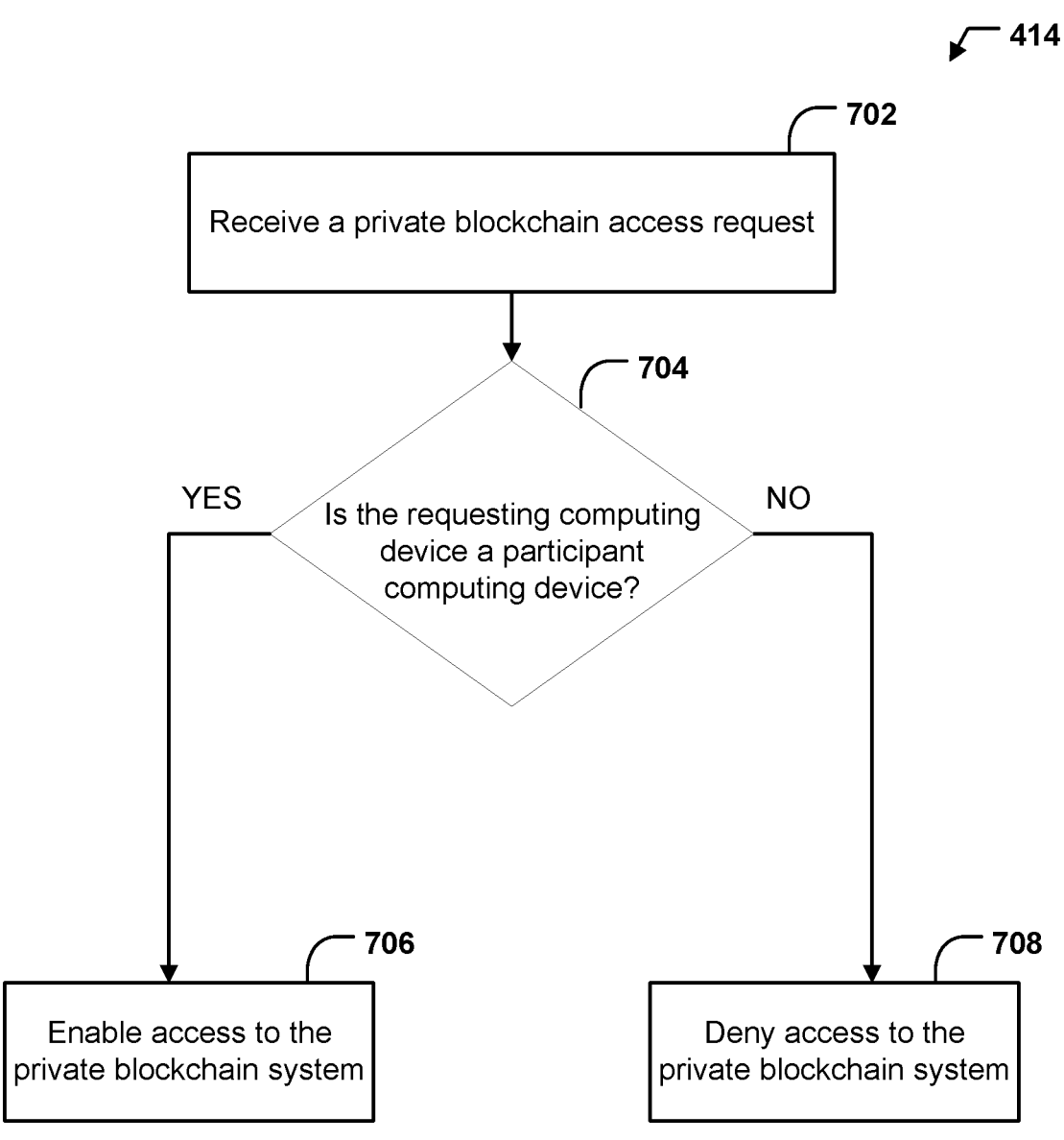
FIG. 7 illustrates an example flowchart for managing access to a private blockchain system, in accordance with some example embodiments described herein.

Turning now to FIG. 7, example operations are depicted for managing access to a private blockchain system. At operation 702, the apparatus 200 includes means such as processor 202, memory 204, communications hardware 206, blockchain access control circuitry 208, NFT generation circuitry 210, and/or the like for receiving a private blockchain access request from a requesting computing device. In some embodiments, the blockchain access control circuitry 208 receives the private blockchain access request from the requesting computing device. In some embodiments, the requesting computing device is configured to generate the private blockchain access request using a blockchain access software application that operates on the requesting computing device. In some embodiments, subsequent to generating the private blockchain access request using the private blockchain software application that operates on the requesting computing device, the requesting computing device is configured to transmit the private blockchain access request to the blockchain access control circuitry 208 of the NFT management computing device 111 of the NFT management system 101 of FIG. 1.

At operation 704, the apparatus 200 includes means such as processor 202, memory 204, communications hardware 206, blockchain access control circuitry 208, NFT generation circuitry 210, and/or the like for determining whether the requesting computing device is a participant computing device. In some embodiments, the blockchain access control circuitry 208 determines whether the requesting computing device is a participant computing device based on access control data maintained by the NFT management storage device 112 of the NFT management system 101 of FIG. 1.

In some embodiments, to determine whether the requesting computing device is a participant computing device, the blockchain access control circuitry 208 determines whether the device identifier of the requesting computing device is among a list of participant computing devices that is maintained by the NFT management storage device 112 of the NFT management system 101 of FIG. 1 as part of access control data. In some embodiments, if the blockchain access control circuitry 208 determines that the device identifier of the requesting computing device is among the list of participant computing device that is maintained by the NFT management storage device 112, the blockchain access control circuitry 208 determines that the requesting computing device is a participant computing device. In some embodiments, if the blockchain access control circuitry 208 determines that the device identifier of the requesting computing device is not among the list of participant computing device that is maintained by the NFT management storage device 112, the blockchain access control circuitry 208 determines that the requesting computing device is not a participant computing device.

In some embodiments, to determine whether the requesting computing device is a participant computing device, the blockchain access control circuitry 208 determines whether the user profile identifier of a user profile that uses the requesting computing device is among a list of participant user profiles that is maintained by the NFT management storage device 112 of the NFT management system 101 of FIG. 1 as part of access control data. In some embodiments, if the blockchain access control circuitry 208 determines that the user identifier of the requesting computing device is among the list of participant user profiles that is maintained by the NFT management storage device 112, the blockchain access control circuitry 208 determines that the requesting computing device is a participant computing device. In some embodiments, if the blockchain access control circuitry 208 determines that the user identifier of the requesting computing device is not among the list of participant user profiles that is maintained by the NFT management storage device 112, the blockchain access control circuitry 208 determines that the requesting computing device is not a participant computing device.

In some embodiments, to determine whether the requesting computing device is a participant computing device, the blockchain access control circuitry 208 determines whether the private blockchain access control circuitry contains valid authentication credentials needed for accessing the private blockchain system. In some embodiments, if the blockchain access control circuitry 208 determines that the private blockchain access control circuitry contains valid authentication credentials needed for accessing the private blockchain system, the blockchain access control circuitry 208 determines that the requesting computing device is a participant computing device. In some embodiments, if the blockchain access control circuitry 208 determines that the private blockchain access control circuitry does not contain valid authentication credentials needed for accessing the private blockchain system, the blockchain access control circuitry 208 determines that the requesting computing device is not a participant computing device.

At operation 706, the apparatus 200 includes means such as processor 202, memory 204, communications hardware 206, blockchain access control circuitry 208, NFT generation circuitry 210, and/or the like for enabling access to the private blockchain system in response to determining that the requesting computing device is a participant computing device. In some embodiments, in response to determining that the requesting computing device is a participant computing device, the blockchain access control circuitry 208 enables a blockchain access software application that operates on the requesting computing device to access data associated with the private NFTs that are stored on the private blockchain system and that are associated with a user profile that is using the requesting computing device. For example, in response to instructions/commands received from the blockchain access control circuitry, the blockchain access software application may be configured to display a private NFT display user interface that enables entering a token identifier for a given private NFT and displaying data associated with the given private NFT, including the event metadata values that are stored as part of the fields of the given private NFT.

Figure 8:
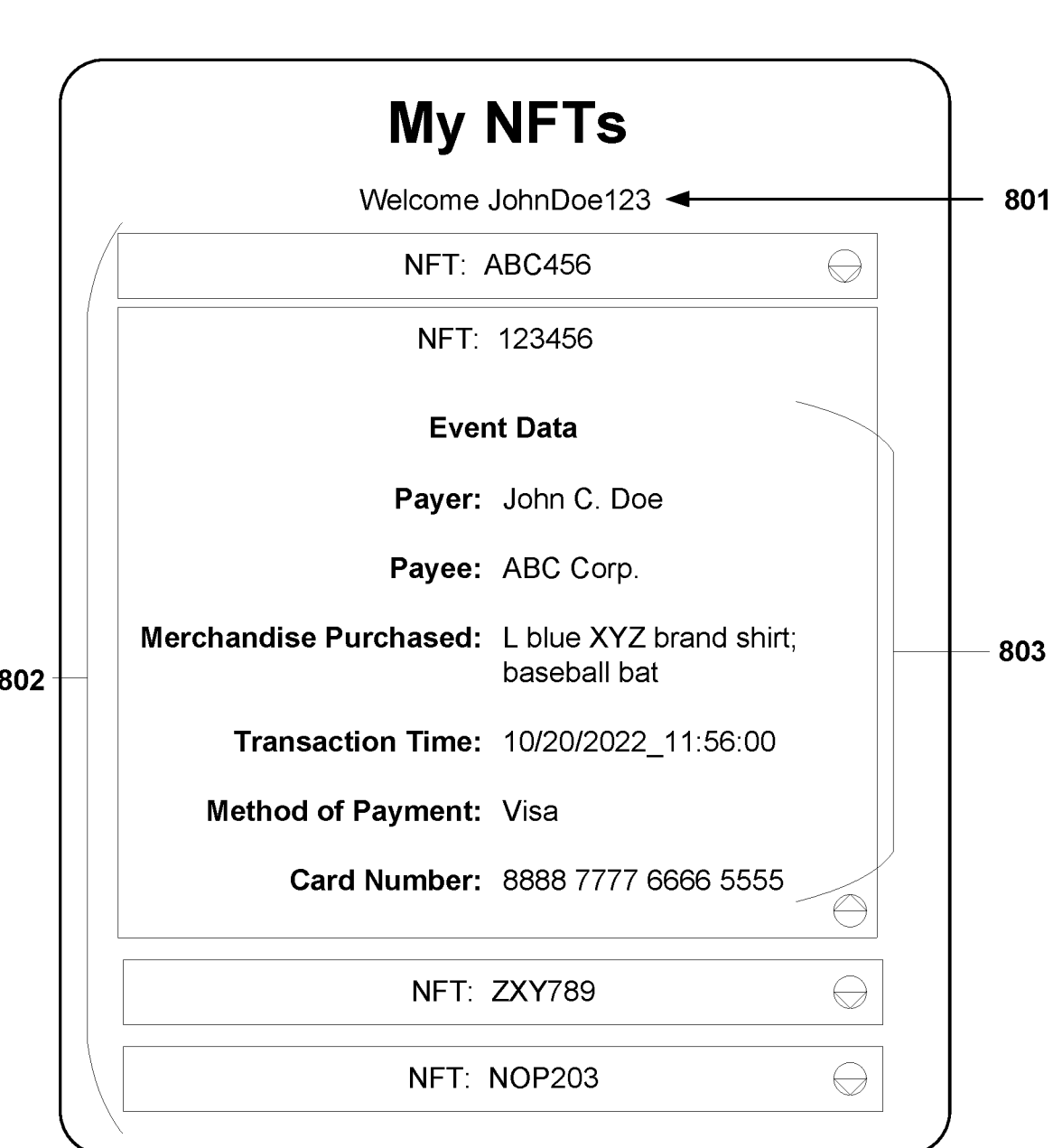
FIG. 8 provides an operational example of a private NFT display user interface, in accordance with some example embodiments described herein.

An operational example of such a private NFT display user interface 800 is depicted in FIG. 8. As shown in FIG. 8, a collection of private NFTs associated with a user identifier 801, which is associated with a user profile, is displayed on the user interface 800. The event metadata values 803 associated with each private NFT 802 may be displayed on user interface 800.

At operation 708, the apparatus 200 includes means such as processor 202, memory 204, communications hardware 206, blockchain access control circuitry 208, NFT generation circuitry 210, and/or the like for denying access to the private blockchain system in response to determining that the requesting computing device is not a participant computing device. As mentioned above, access to the private blockchain system is restricted to one or more participant computing devices associated with the one or more participant user profiles. That is, the private blockchain system may only be accessed by the one or more participant computing devices which are associated with the one or more participant user profiles and access is denied to other computing devices (e.g., non-participant computing devices). In some embodiments, in response to determining that the requesting computing device is not a participant computing device, the blockchain access control circuitry 208 prevents a blockchain access software application that operates on the requesting computing device from accessing data associated with the private NFTs that are stored on the private blockchain. In some embodiments, in response to determining that the requesting computing device is not a participant computing device, the blockchain access control circuitry 208 enables a blockchain access software application that operates on the requesting computing device to access data associated with the public NFTs that are stored on the public blockchain system. For example, in response to instructions/commands received from the blockchain access control circuitry, the blockchain access software application may be configured to display a public NFT display user interface that enables entering a token identifier for a given public NFTs and displaying data associated with the given public NFT, such as the event metadata fields for the event metadata values that are stored as part of the fields of the corresponding private NFT.

An operational example of such a public NFT display user interface 900 is depicted in FIG. 9. As depicted in FIG. 9, the public NFT display user interface 900 displays event metadata fields described by a requested public NFT that is stored as part of the public blockchain system. As shown in FIG. 9, a collection of public NFTs is displayed on the user interface 900. The sanitized event metadata values 903 associated with each public NFT 902 may be displayed on user interface 900.

CONCLUSION

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

The invention claimed is:

1. A computer-implemented method for generating a non-fungible token (NFT) representation for an event data object, the computer-implemented method comprising:

receiving, by communications hardware, the event data object, wherein the event data object comprises one or more event metadata values and is associated with one or more participant user profiles;

generating, by NFT generation circuitry, a private NFT comprising an event metadata value based on one or more event metadata fields that are described by the event data object;

determining, by the NFT generation circuitry, a sanitization technique for each event metadata value;

converting, by the NFT generation circuitry using the determined sanitization technique, the event metadata value to a sanitized metadata value by:

selecting, by the NFT generation circuitry using the determined sanitization technique, the one or more event metadata fields associated with the event metadata value;

anonymizing, by the NFT generation circuitry, the one or more selected event metadata fields using a randomizing sanitization technique; and replacing, by the NFT generation circuitry using the determined sanitization technique, the one or more event metadata fields with the sanitized metadata values;

generating, by the NFT generation circuitry, a public NFT comprising the sanitized event metadata value;

storing, by the NFT generation circuitry, the private NFT in a private blockchain system, wherein access to the private blockchain system is restricted to one or more participant computing devices associated with the one or more participant user profiles;

providing remote access, by blockchain access control circuitry using a public blockchain system, to the public NFT to users over a network, at least in part, by storing, by the NFT generation circuitry, the public NFT in a public blockchain system, wherein the public blockchain system is publicly accessible;

generating, by the NFT generation circuitry, NFT configuration data that comprises:

(i) an NFT identifier for the private NFT, (ii) an NFT identifier for the public NFT, and (iii) a cross-token mapping that describes a relationship between the private NFT and the public NFT; and storing, by the NFT generation circuitry, the NFT configuration data.

2. The computer-implemented method of claim 1, wherein the event metadata value and the sanitized event metadata value are associated with a same event metadata field.

3. The computer-implemented method of claim 1, wherein the event metadata value is associated with an event metadata field, wherein the event metadata field is associated with the randomizing sanitization technique, wherein the sanitized event metadata value is generated by processing the event metadata value in accordance with the randomizing sanitization technique.

4. The computer-implemented method of claim 1, further comprising:

receiving, by the communications hardware, a private blockchain access request from a requesting computing device;

determining, by blockchain access control circuitry, whether the requesting computing device is a participant computing device; and in response to determining that the requesting computing device is a participant computing device, enabling, by the blockchain access control circuitry, the requesting computing device to access the private blockchain system.

5. The computer-implemented method of claim 1, further comprising:

receiving, by the communications hardware, a private blockchain access request from a requesting computing device;

determining, by blockchain access control circuitry, whether the requesting computing device is a participant computing device; and in response to determining that the requesting computing device is not a participant computing device, denying, by the blockchain access control circuitry, the requesting computing device of access to the private blockchain system.

6. The computer-implemented method of claim 5, further comprising in response to determining that the requesting computing device is not a participant computing device, enabling, by the blockchain access control circuitry, the requesting computing device to access the public blockchain system.

7. An apparatus for generating a non-fungible token (NFT) representation for an event data object, the apparatus comprising:

communications hardware configured to receive the event data object, wherein the event data object comprises one or more event metadata values and is associated with one or more participant user profiles;

NFT generation circuitry coupled to a memory storing software instructions that, when executed by the NFT generation circuitry, cause the NFT generation circuitry to perform operation comprising:

generating a private NFT comprising an event metadata value based on one or more metadata fields that are described by the event data object;

determining a sanitization technique for each event metadata value;

converting, using the determined sanitization technique, the event metadata value to a sanitized metadata value by:

selecting, using the determined sanitization technique, a the one or more event metadata fields associated with the event metadata value;

anonymizing the one or more selected event metadata fields using a randomizing sanitization technique; and replacing, using the determined sanitization technique, the one or more event metadata fields with the sanitized metadata values; and generating a public NFT comprising the sanitized event metadata value; and storing the private NFT in a private blockchain system, wherein access to the private blockchain system is restricted to one or more participant computing devices associated with the one or more participant user profiles; and providing remote access, using a public blockchain system, to the public NFT to users over a network, at least in part, by storing the public NFT in a public blockchain system, wherein the public blockchain system is publicly accessible, wherein the NFT generation circuitry is configured to:

generating NFT configuration data that comprise;

(i) an NFT identifier for the private NFT, (ii) an NFT identifier for the public NFT, and (iii) a cross-token mapping that describes a relationship between the private NFT and the public NFT, and storing the NFT configuration data.

8. The apparatus of claim 7, wherein the event metadata value and the sanitized event metadata value are associated with a same event metadata field.

9. The apparatus of claim 8, wherein the event metadata value is associated with an event metadata field, wherein the event metadata field is associated with and the randomizing sanitization technique, wherein the sanitized event metadata value is generated by processing the event metadata value in accordance with the randomizing sanitization technique.

10. The apparatus of claim 7, wherein the NFT generation circuitry further perform operation comprising:

receiving, via the communications hardware, a private blockchain access request from a requesting computing device;

determining whether the requesting computing device is a participant computing device; and in response to determining that the requesting computing device is a participant computing device, enabling the requesting computing device to access the private blockchain system.

11. The apparatus of claim 7, wherein the NFT generation circuitry further perform operation comprising:

receiving, via the communications hardware, a private blockchain access request from a requesting computing device;

determining whether the requesting computing device is a participant computing device; and in response to determining that the requesting computing device is not a participant computing device, denying the requesting computing device of access to the private blockchain system.

12. The apparatus of claim 11, wherein in response to determining that the requesting computing device is not a participant computing device, the NFT generation circuitry further perform operation comprising:

enabling the requesting computing device to access the public blockchain system.

13. A non-transitory computer program product for generating a non-fungible token (NFT) representation for an event data object, the computer program product comprising at least one non-transitory computer-readable storage medium storing software instructions that, when executed by an NFT generation circuitry perform operation comprising:

receiving the event data object, wherein the event data object comprises one or more event metadata values and is associated with one or more participant user profiles;

generating a private NFT comprising an event metadata value based on one or more metadata fields that are described by the event data object;

determining a sanitization technique for each event metadata value;

converting, using the determined sanitization technique, the event metadata value to a sanitized metadata value by:

selecting, using the determined sanitization technique, a the one or more event metadata fields associated with the event metadata value;

anonymizing the one or more selected event metadata fields using a randomizing sanitization technique; and replacing, using the determined sanitization technique, the one or more event metadata fields with the sanitized metadata values; and generating a public NFT comprising the sanitized event metadata value;

storing the private NFT in a private blockchain system, wherein access to the private blockchain system is restricted to one or more participant computing devices associated with the one or more participant user profiles;

providing remote access, using a public blockchain system, to the public NFT to users over a network, at least in part, by storing the public NFT in a public blockchain system, wherein the public blockchain system is publicly accessible;

generating NFT configuration data that comprises;

(i) an NFT identifier for the private NFT, (ii) an NFT identifier for the public NFT, and (iii) a cross-token mapping that describes a relationship between the private NFT and the public NFT; and storing the NFT configuration data.

14. The computer program product of claim 13, wherein the event metadata value and the sanitized event metadata value are associated with a same event metadata field.

15. The computer program product of claim 13, wherein the event metadata value is associated with an event metadata field, wherein the event metadata field is associated with the sanitization technique, wherein the sanitized event metadata value is generated by processing the event metadata value in accordance with the sanitization technique.

16. The computer program product of claim 13, wherein the software instructions, when executed, further cause the NFT generation circuitry perform operation comprising:

receiving a private blockchain access request from a requesting computing device;

determining whether the requesting computing device is a participant computing device; and in response to determining that the requesting computing device is a participant computing device, enabling the requesting computing device to access the private blockchain system.

17. The computer program product of claim 13, wherein the software instructions, when executed, further cause the NFT generation circuitry perform operation comprising:

receiving a private blockchain access request from a requesting computing device;

determining whether the requesting computing device is a participant computing device; and in response to determining that the requesting computing device is not a participant computing device, denying the requesting computing device of access to the private blockchain system.

18. The computer program product of claim 17, wherein the software instructions, when executed, further cause the apparatus to, in response to determining that the requesting computing device is not a participant computing device, enable the requesting computing device to access the public blockchain system.

19. The computer-implemented method of claim 1, wherein the NFT configuration data further comprises a data field that describes at least one of (a) a participant computing device that is authorized to access the private blockchain system or (b) a participant user profile that is authorized to access the private blockchain system.

20. The apparatus of claim 7, wherein the NFT configuration data further comprises a data field that describes at least one of (a) a participant computing device that is authorized to access the private blockchain system or (b) a participant user profile that is authorized to access the private blockchain system.

* * * * *